US012643979B2

(12) United States Patent
Pilla et al.

(10) Patent No.: US 12,643,979 B2
(45) Date of Patent: Jun. 2, 2026

(54) NON-ISOCYANATE POLYURETHANES FROM BIO-BASED POLYOLS

(71) Applicant: CLEMSON UNIVERSITY RESEARCH FOUNDATION, Clemson, SC (US)

(72) Inventors: Srikanth Pilla, Clemson, SC (US); James Scott Sternberg, Clemson, SC (US)

(73) Assignee: CLEMSON UNIVERSITY RESEARCH FOUNDATION, Clemson, SC (US)

( * ) Notice: Subject to any disclaimer, the term of this patent is extended or adjusted under 35 U.S.C. 154(b) by 744 days.

(21) Appl. No.: 18/007,992

(22) PCT Filed: Jun. 3, 2021

(86) PCT No.: PCT/US2021/035629

§ 371 (c)(1),
(2) Date: Dec. 2, 2022

(87) PCT Pub. No.: WO2021/247815

PCT Pub. Date: Dec. 9, 2021

(65) Prior Publication Data

US 2023/0340200 A1 Oct. 26, 2023

Related U.S. Application Data

(60) Provisional application No. 63/034,584, filed on Jun. 4, 2020.

(51) Int. Cl.

| | |
|---|---|
| ***C08G 71/04*** | (2006.01) |
| *C08G 101/00* | (2006.01) |

(52) U.S. Cl.

CPC ......... *C08G 71/04* (2013.01); *C08G 2101/00* (2013.01)

(58) Field of Classification Search

None

See application file for complete search history.

(56) References Cited

U.S. PATENT DOCUMENTS

2007/0173348 A1* 7/2007 Rajagopalan ........ C08G 18/758 473/351

2013/0255216 A1* 10/2013 Argyropoulos ....... C08L 97/005 264/29.4

(Continued)

FOREIGN PATENT DOCUMENTS

WO WO2015107113 7/2015

OTHER PUBLICATIONS

New Environmentally Friendly Approach to Lignin-Based Cyclic Carbonates, Kuhnel et al., Macromol. Chem. Phys., 2018, 219, 1700613. (Year: 2018).*

(Continued)

*Primary Examiner* — Peter A Salamon

(74) *Attorney, Agent, or Firm* — DORITY & MANNING, P.A.

(57) ABSTRACT

Bio-based polymer precursors and non-isocyanate polyurethanes (NIPU) and non-isocyanate polyurethane foams (NIPUF) that can be formed from the precursors, as well as methods for the synthesis of the precursors and the polyurethane products are described. The bio-based polymer precursors are formed through functionalization of a bio-based polyol, e.g., lignin, with cyclic carbonates. The bio-based polyol starting materials need not be pre-processed and can include Kraft lignin. NIPU/NIPUF can be synthesized through a ring opening curing reaction of cyclic carbonates of the bio-based polyol precursor with diamines. The carbonates and diamines can include non-toxic bio-based carbonates.

4 Claims, 11 Drawing Sheets

(56) References Cited

U.S. PATENT DOCUMENTS

| | | | | |
|---|---|---|---|---|
| 2015/0057397 | A1* | 2/2015 | Bradshaw | C08K 5/1565 549/252 |
| 2015/0166836 | A1* | 6/2015 | Liu | C09D 197/005 524/76 |
| 2015/0259369 | A1* | 9/2015 | McKellar | C07G 1/00 530/502 |
| 2017/0253689 | A1* | 9/2017 | Moon | C08G 18/7664 |
| 2018/0360042 | A1* | 12/2018 | Weiß | A01N 43/653 |
| 2020/0099090 | A1* | 3/2020 | Li | H01M 10/058 |

OTHER PUBLICATIONS

Alinejad et al., “Lignin-Based Polyurethanes: Opportunities for Bio-Based Foams, Elastomers, Coatings and Adhesives”, Polymers, 2019 21 pages.

Guan et al.. “Progress in Study of Non-Isocyanate Polyurethane”, Industrial & Engineering Chemistry Research, vol. 50, 2011, 11 pages.

International Search Report and Written Opinion for PCT/US2021/035629, dated Sep. 10, 2021, 9 pages.

Alinejad et al. “Lignin-Based Polyurethanes: Opportunities for Bio-Based Foams, Elastomers, Coatings and Adhesives” Polymers, 2019, 11, 1202.

Guan et al. “Progress in Study of Non-Isocyanate Polyurethane” I&EC Research, 2011, 50, 6517-6527.

Kuhnel et al. “A New Environmentally Friendly Approach to Lignin-Based Cyclic Carbonates” Macromolecular Chemistry and Physics, 2018.

Kuhnel et al. “Oxyalkylation of ligning with propylene carbonate: Influence of reaction parameters on the ensuing bio-based polyols” Industrial Crops and Products 101, 2017, 75-83.

Tenorio-Alfonso et al. “A Review of the Sustainable Approaches in the Production of Bio-based Polyurethanes and Their Applications in the Adhesive Field” Journal of Polymers and Environment, 28, 2020, 749-774.

Extended European Search Report for CXU-1017-EP mailed May 16, 2024 13 Pages.

CN Office Action for CXU-1017-CN mailed Aug. 12, 2024 8 pages.

* cited by examiner

NON-ISOCYANATE POLYURETHANES FROM BIO-BASED POLYOLS

CROSS REFERENCE TO RELATED APPLICATIONS

This application is the national stage entry of International Patent Application Number PCT/US2021/035629, filed on Jun. 3, 2021, which claims filing benefit of U.S. Provisional Patent Application Ser. No. 63/034,584, having a filing date of Jun. 4, 2020, both of which are incorporated herein in their entirety by reference thereto.

BACKGROUND

Polyurethanes are among the top six polymers produced in the world and are widely used in the automotive, furniture, construction, coatings and appliance industries, among many others, due to their beneficial characteristics including light weight, high impact resistance, and good insulating properties. This versatility is due in large part to the ease and efficiency of the reaction of polyols with diisocyanates to create polyurethane materials anywhere from flexible-to-rigid in form including polyurethane foams. Unfortunately, the use of diisocyanates have landed polyurethanes atop a list for the 50 most toxic polymers due to the diisocyanate formation route making use of the deadly gas phosgene. In addition, diisocyanates have been labeled a "CMR" (Cancer causing, Mutagenic and Reproductive toxin) by the European community and have gained similar warnings in the United States.

The demand for environmentally benign material synthesis has grown in recent decades supported by the green chemistry movement, as well as an interest in replacing petroleum-derived chemicals with chemical precursors derived from biomass. The toxicity associated with petroleum resources as well as a desire to lower the overall carbon footprint of industrial processes has led efforts in support of the bio-refinery concept in which natural materials are used as feedstock for chemical and material production. With the initial success of cellulosic ethanol production including the benefits of lowering the mean ethanol selling price (MESP) to compete with petroleum-derived fuels, an increasing demand to valorize other biomass sources, and in particular, the lignin component of biomass, has gained momentum.

One promising way to valorize lignin is through polymer synthesis methods that can replace the traditional petroleum-derived route to polymer production and instead harness lignin, the world's most abundant source of aromatic carbon. A survey of the literature surrounding polymers derived from lignin presents some innovative ways of using green chemistry approaches. Unfortunately, the wider use of lignin in polymer formation is often hampered due to its low reactivity, heterogeneity, and the necessity of employing extensive purification and/or functionalization measures to ensure materials of comparable quality to current petroleum-based standards. As a result, although lignin can be used as a renewable feedstock, typical protocols still make use of harmful, toxic, petroleum-derived solvents and reagents, thereby lowering the bio-based carbon content and renewability of lignin-based polymer formulations.

The incorporation of lignin in polyurethanes and polyurethane foams is a well-researched topic, showing that lignin can be used to replace traditional polyols used in the reaction with diisocyanates. However, issues still remain. For instance, to synthesize lignin-based polyurethane foams with similar properties to conventional materials, propylene oxide has been used to simultaneously liquify lignin and extend nascent hydroxyl groups to create a more reactive lignin-derived precursor. The toxicity and explosive hazard associated with propylene oxide has led researchers to look for a more benign route to lignin functionalization. Moreover, lignin-derived polyurethane foams still require the use of a diisocyanate-based precursor.

While lignin-derived non-foam non-isocyanate polyurethanes have been produced, these attempts have resulted in materials too brittle for mechanical characterization or too unreactive to achieve meaningful results.

What are needed in the art are bio-based precursors from bio-based polyols such as precursors based on lignin or other natural materials that can be utilized in forming non-isocyanate polyurethanes (NIPU) and non-isocyanate polyurethane foams (NIPUF). NIPU and NIPUF that exhibit high bio-based carbon content that also exhibit excellent physical characteristics on a par with isocyanate-based counterparts would be of great benefit to the art.

SUMMARY

According to one embodiment, disclosed is a bio-based precursor that includes a functionalized bio-based polyol, the functionalization comprising cyclic carbonate functionality. A bio-based precursor can include cyclic carbonate functionality in a concentration of about 1.8 mmol cyclic carbonate per gram total polyol or greater. In addition, the bio-based precursor can have a high bio-based carbon content, for instance, about 95% or greater, for instance as may be determined by radiocarbon dating according to ASTM D6866-20.

Also disclosed is a NIPU that includes the reaction product of a bio-based precursor as described and a diamine, the NIPU including a hard segment comprising the bio-based precursor reaction product and a soft segment comprising the diamine reaction product. The diamine can be a fatty-acid based diamine, e.g., a 100% bio-based carbon content fatty acid polyvalent diamine, and the polyurethane can have a bio-based carbon content of about 90% or greater. In one embodiment, the NIPU can be a NIPUF. An NIPU can have excellent physical characteristics, such as an ultimate strength of about 10 MPa or greater, an ultimate strain of about 10 MPa or greater, and/or a tensile modulus of about 135 MPa or greater as determined according to ASTM D638. In the case of a foam, a NIPUF can exhibit a density of about 100 $kg/m^3$ or greater, for instance from about 110 $kg/m^3$ to about 130 $kg/m^3$, and/or a compressive strength at 10% strain of about 80 kPa or greater.

Also disclosed are methods for forming the precursors and methods for forming NIPU/NIPUF by use of the precursors. A method can include a chain extending reaction of a bio-based polyol with a first organic carbonate, and in one embodiment, a non-toxic bio-based organic carbonate, to form an oxyalkylated polyol. Following, a method can include a transesterification reaction of the oxyalkylated polyol with a second organic carbonate to insert cyclocarbonate structures on the polyol backbone and form a bio-based precursor. The chain extending reaction can be carried out at a relatively low temperature, e.g., about 160° C. or less, for a relatively short period of time, e.g., about 2 hours or less, and the transesterification reaction can be carried out at a temperature of about 100° C. or less for a time of about 5 hours or less.

A polyurethane formation method can include reaction of a bio-based precursor with a diamine, e.g., a bio-based polyvalent diamine, in a ring-opening polymerization reaction. A NIPUF can be formed by addition of a blowing agent during the polymerization reaction, e.g., a bio-based foaming agent.

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying figures in which.

Figure 1:
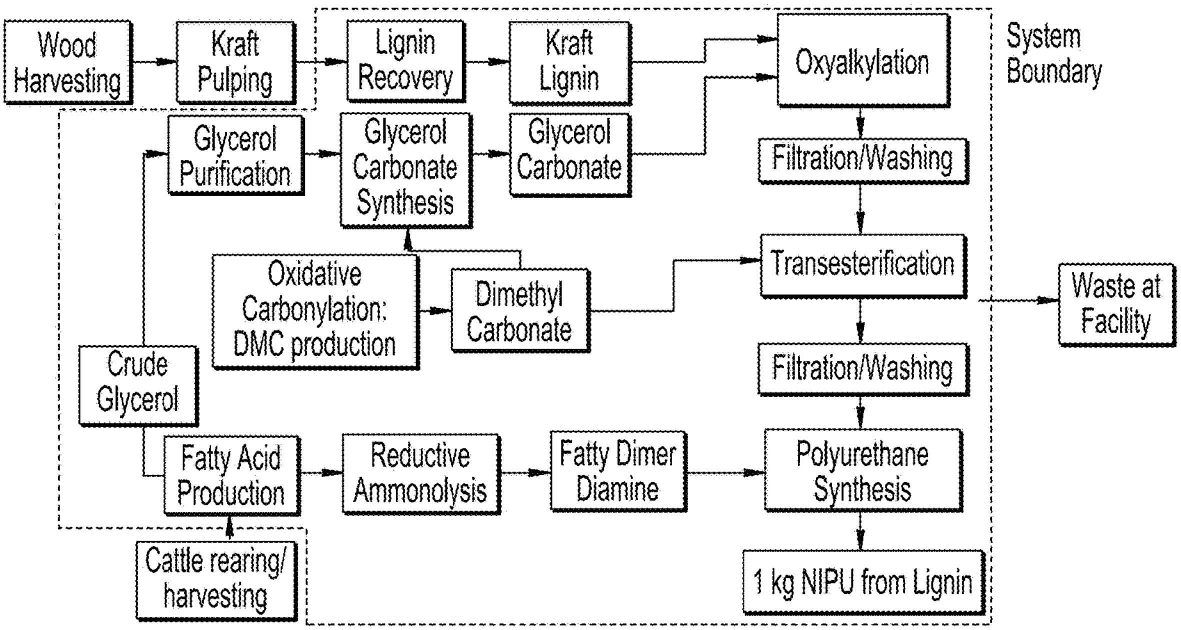
FIG. 1 is a flow-sheet for one embodiment of a bio-based NIPU formation process.

Repeat use of reference characters in the present specification and drawings is intended to represent the same or analogous features or elements of the present invention.

DETAILED DESCRIPTION

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment, may be used in another embodiment to yield a still further embodiment.

The present disclosure is directed to bio-based polymer precursors and NIPU and NIPUF that can be formed from the precursors, as well as methods for the synthesis of the precursors and the polyurethane products. More specifically, disclosed are NIPU/NIPUF that can be synthesized through a ring opening curing reaction of bio-based cyclic carbonates with diamines. The bio-based precursors can be formed through functionalization of a bio-based polyol with a cyclic carbonate. A bio-based polyol can include a lignin-based polyol and/or a polyol derived from bio-based processes such as the processing of fatty acids from algae, animal or vegetable origins; bacterial processes that produce a mixture or selective number of diols; and from production of diols such as ethylene glycol from bio-based carbohydrates, etc. The polyol component can include a mixture of bio-based and conventional (non-bio-based) polyols. In those embodiments in which the polyol includes a lignin-derived polyol, the lignin starting materials need not be pre-processed and can include Kraft lignin. The carbonates and diamines can include non-toxic bio-based carbonates.

NIPU/NIPUF formation methods include approaches designed to compatibilize a bio-based precursor with a diamine to produce non-isocyanate polyurethane products that exhibit characteristics on a par with more traditional isocyanate-based materials. Methods can enable formation of NIPU and NIPUF using biomass as feedstock for both the bio-based precursor and the curing agent in some embodiments. The beneficial properties of the biomass-derived products are believed to result from the high reactivity observed between the cyclocarbonate and diamine precursors leading to rapid gelation of a reaction mixture. The NIPU/NIPUF products can exhibit a dual phase polymeric structure with tunable properties based on the addition of the curing agent or other polymerization agents. The simplicity and non-toxicity of the protocol can overcome some of the main hurdles with regard to biomass-derived chemistry such as lignin chemistry including low reactivity, solubility and compatibility with curing agents, as well as avoid formation of excessively brittle structures as has been formed by previously known methods and materials.

The bio-based precursors can provide for a non-isocyanate formation route with sufficient reactivity not only to ensure impressive mechanical properties, but also to cure on the timescale of the foaming reaction required to create lightweight NIPUF. In addition, the materials and methods can provide for formation of NIPU and NIPUF containing very high bio-based carbon content. For instance, a bio-based precursor can have a bio-based carbon content of about 95% or greater, or about 98% or greater in some embodiments. A NIPU or a NIPUF formed from the bio-based precursors can have a bio-based carbon content of about 90% or greater, about 92% or greater, or about 95% or greater in some embodiments. The bio-based carbon content can be calculated based on known procedures; for instance, by use of the procedure of Pan et al. (Biomacromolecules 12, 2416-2428 (2011)) by relating the total amount of bio-renewable carbon to the total amount carbon present in a formulation. The bio-based carbon content can be determined in some embodiments by radioactive carbon dating, for instance according to ASTM D6866-20.

In one embodiment, disclosed methods can be utilized to form NIPU or NIPUF entirely from bio-based materials. For instance, FIG. 1 presents one embodiment of a formation process that can utilize starting materials that are entirely bio-based. As illustrated, animal-based starting materials can be derived from animal processing/rendering plants such as in the cattle rearing/harvesting industry or any other animal processing facility including, without limitation, cattle, pig, chicken, fish, sheep, etc. processing, as well as combinations of animal-derived feedstock materials. Animal processing facilities can also provide organic materials for use in formation of organic carbonates used in production of a bio-based precursor, as well as providing fatty acids for production of a fatty-acid based diamine curing agent. Starting materials can also be derived from plant processing, as well as algae harvesting sources.

A process can utilize a lignin-containing feedstock such as may be obtained from a wood processing operation in production of the bio-based polyol component. However, it should be understood that disclosed methods can obtain a lignin starting material from any lignocellulosic biomass source material including both woody and non-woody sources. Woody lignocellulosic biomass can be sourced from forests, agriculture, or any other source and can encompass hardwood and/or softwood source materials. For example, fast-growing tree species, such as hybrid willow (Salix) and poplar as have been developed for production in agricultural settings, can be utilized.

Agriculture systems can be a source of non-woody lignin or other polyol biomass source materials. Agricultural systems can produce several different types of non-woody lignocellulosic biomass materials including primarily cellulosic materials such as plant leaves and higher lignin-content materials such as stems and stalks. For example, harvesting of cereals, vegetables, and fruits can provide lignocellulosic polyol biomass source materials. Agricultural residues including field residues and processing residues can provide lignocellulosic polyol source materials. Field residues include materials left in an agricultural field after harvesting the crop, and can include, without limitation, straw and stalks, leaves, and seed pods. Processing residues, such as husks, seeds, bagasse, and roots, include those materials left after the processing of the crop into a desired form. Examples of agricultural residue source materials can include, without limitation, rice straw, wheat straw, corn stover, and sugarcane bagasse.

Other waste streams, such as municipal waste, construction waste, sawmill waste, etc., can provide a lignocellulosic polyol biomass source material. For instance, yard waste, holiday waste, etc. can provide a lignocellulosic polyol source material in some embodiments.

Perennial and annual grasses can provide lignocellulosic polyol source materials. Examples of grass source materials can include, without limitation, switchgrass (*Panicum virgatum*), miscanthus (*Miscanthus* spp. *Anderss.*), canary grass (*Phalaris arundinacea*), giant reed (*Arundo donax* L.), alfalfa (*Medicago sativa* L.), sorghum (*Sorghum bicolor*) and Napier grass (*Pennisetum purpureum*).

Vegetable oils can be a source for bio-based polyols for creation of the bio-based precursors. Edible oils such as soy, rapeseed, corn, cottonseed, and olive oil can be a source of a bio-based polyol. A bio-based polyol can also be sourced from more sustainable non-edible oils such as castor oil, mahua oil, or perilla oils. Animal and/or algal lipids can also be used as source for bio-based polyols; for instance, in the rendering process where fatty acids are produced from triglycerides. Bacterial processes can also produce polyols capable of further functionalization. Carbohydrates, such as naturally produced carbohydrates (e.g., C3 to C12 carbohydrates), can also be a source of polyols (e.g., diols) through the known reduction reaction.

In one embodiment, a lignin-containing feedstock can be utilized in forming a bio-based precursor. For instance, an industrial lignin obtained by a Kraft pulping process, which has been considered too difficult to work with in many previously known bio-based chemical processing attempts, can be utilized in forming a lignin-based precursor. By way of example, a lignin feedstock can be obtained from Kraft pulping produced by precipitation of a lignin-containing portion of the black liquor. In such an embodiment, the precipitate can include a lignin feedstock for disclosed methods. Such a black liquor precipitation process can separate a portion of the impurities contained in the black liquor such as ash, metals, hemicellulose, etc., from the lignin feedstock. For example, a black liquor may be subjected to carbon dioxide and/or sulfuric acid acidification to precipitate out a lignin feedstock, leaving impurities behind in the remaining liquor portion. Of course, such a precipitation treatment is not limited to Kraft black liquor source materials. In another embodiment, an alkaline liquor obtained from processing of a source material such as an agricultural residue (e.g., corn stover) can be pretreated via acidification with an inorganic or organic acid, which can precipitate out a lignin-containing feedstock, leaving impurities behind in the remaining alkaline liquor.

Beneficially, in one embodiment, a lignin feedstock can be utilized that has not been subjected to further processing, e.g., a Kraft lignin with a relatively high polydispersity index that has not been subjected to fractionation or depolymerization preprocessing. Use of such a feedstock can not only decrease costs of a polyurethane formation process, but can also increase the bio-based carbon content of polyurethanes made by the process. For instance, a bio-based polyol feedstock can have a polydispersity index of about 2 or greater, or about 3 or greater in some embodiments.

As utilized herein, the polydispersity index (PDI) refers to a measure of the distribution of molecular mass in a given polymer sample. The PDI calculated is the weight average molecular weight divided by the number average molecular weight. It indicates the distribution of individual molecular masses in a polymer sample. The PDI has a value equal to or greater than 1, but as the polymer chains approach uniform chain length, the PDI approaches unity (i.e., 1).

The "number average molecular weight" ($M_n$) is readily calculated by one of ordinary skill in the art, and generally refers to the ordinary arithmetic mean or average of the molecular weights of the individual macromolecules. It is determined by measuring the molecular weight of n polymer molecules, summing the weights, and dividing by n, such as represented in the formula:

$$\overline{M}_n = \frac{\sum_i N_i M_i}{\sum_i N_i}$$

where $N_i$ is the number of molecules of molecular weight $M_i$. The number average molecular weight of a polymer can be determined by gel permeation chromatography, and all colligative methods, like vapor pressure osmometry or end-group determination.

The "weight average molecular weight" ($M_w$) is readily calculated by one of ordinary skill in the art, and generally refers to:

$$\overline{M}_w = \frac{\sum_i N_i M_i^2}{\sum_i N_i M_i}$$

where $N_i$ is the number of molecules of molecular weight $M_i$. The weight average molecular weight can be determined by light scattering, small angle neutron scattering (SANS), X-ray scattering, gel permeation chromatography, and sedimentation velocity.

The polyol feedstock can be processed to form a cyclocarbonated bio-based precursor that can then be utilized in a ring opening reaction of cyclic carbonates of the precursor with a diamine curing agent to form a polyurethane. The bio-based precursor can be formed through reaction of a polyol feedstock or a reaction product of a polyol feedstock with one or more carbonates, which can extend both aromatic and aliphatic hydroxyl groups of a polyol feedstock with etherified and carboxylated chains thus increasing the reactivity of the bio-based polyol precursor toward a curing agent.

In one embodiment, organic carbonates can be utilized in forming a bio-based precursor rather than metal carbonates as organic carbonates can have a bio-based origin, exhibit non-toxicity and can utilize mild reaction conditions. In addition, the unwanted homopolymerization of propylene oxide (often used to make more reactive lignin precursors) can be avoided with the use of a well-controlled reaction of organic carbonates.

Figure 2:
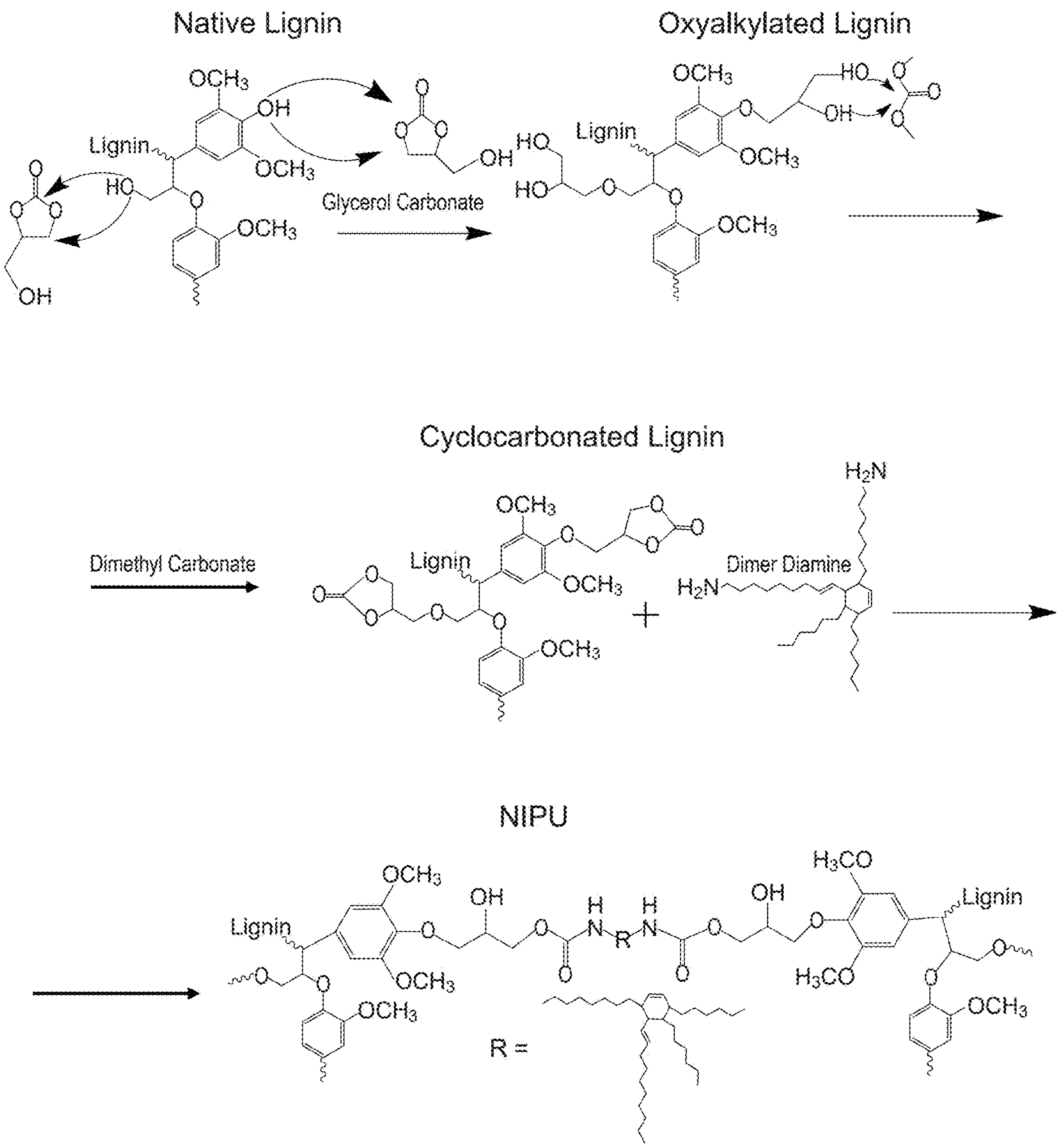
FIG. 2 presents a reaction scheme for one embodiment of a NIPU formation.

The cyclocarbonated bio-based precursor can be formed according to a two-step reaction process, the first of which can form an oxyalkylated polyol. According to this first reaction, the aliphatic and aromatic hydroxyls of a polyol feedstock can react with an organic carbonate to incorporate liable ether and carbonyl groups on the backbone of the polyol while terminating the chain extended precursor in a 1,2-diol (FIG. 2). In one embodiment, the organic carbonate can be a bio-based carbonate derived from a natural resource, rather than a petroleum-based carbonate, which can increase the bio-based carbon content of the bio-based precursor, as well as that of a polyurethane product formed from the precursor.

As indicated in FIG. 1, in one embodiment, a glycerol carbonate can be utilized to obtain the cyclocarbonate groups and the glycerol carbonate can be derived from bio-based glycerol obtained from animal fat. Bio-based glycerol as produced from plant oil can also be utilized in forming a bio-based glycerol carbonate. For instance, glycerol can be obtained from a natural resource by a hydrolysis reaction as is generally known in the art. Hydrolysis is a known process that includes reacting plant oil or animal fat with water to break down the plant oil or animal fat into free fatty acid and glycerol. Optionally, a catalyst can be employed in the reaction. Further, the reaction can include the application of heat to accelerate the reaction. Following, a bio-based glycerol can be reacted with a dialkylcarbonate, for example, dimethyl carbonate as illustrated in FIG. 1, or a cyclic alkylene carbonate, to form a bio-based glycerol carbonate.

As illustrated in FIG. 2, in one embodiment, a glycerol carbonate reactant can be utilized in the oxyalkylation reaction. This first step of the precursor formation process is not limited to functionalization of a polyol, e.g., lignin, with a glycerol carbonate, however, and other organic carbonates can alternatively be utilized. For instance, the functionalization agent can be a cyclic organic carbonate having the general structure:

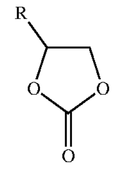

in which R is H, or C1 to C18 alkyl or C1 to C19 alcohol.

Examples of cyclic organic carbonate can include, without limitation, ethylene carbonate, propylene carbonate, 1,2- or 2,3-butylene carbonate, etc., as well as combinations of cyclic organic carbonates.

The organic carbonate utilized in the oxyalkylation of the polyol feedstock is not limited to cyclic organic carbonates and non-cyclic carbonates can alternatively be utilized, as well as combinations of cyclic and non-cyclic carbonates. By way of example, non-cyclic organic carbonates can include, without limitation, dimethyl carbonate or other dialkyl carbonates. Examples of organic carbonate reactants can include, without limitation, dimethyl carbonate, diethyl carbonate, di (n-propyl) carbonate, di (iso-propyl) carbonate, di (n-butyl) carbonate, di (sec-butyl) carbonate, di (tert-butyl) carbonate, or dihexyl carbonate.

The organic carbonate of the oxyalkylation reaction step can generally be provided in an amount of from about 5 equivalents to about 15 equivalents, based upon the hydroxyl content of the polyol; for instance, about 10 equivalents organic carbonate according to the hydroxyl content of the polyol, in one embodiment.

The oxyalkylation reaction can utilize a catalyst as is known in the art. In one embodiment, the catalyst can be a non-metallic catalyst, e.g., a non-metallic bio-based catalyst. Examples of non-metallic catalysts for an oxyalkylation reaction can include, without limitation, 1,8diazabicyclo [5.4.0]undec-7-ene (DBU), triethylamine, 1,5,7-triazabicyclo[4.40]dec-5-ene (TBD), 2-chloro-4,4,5,5-tetramethyl-1,3,2-dioxaphospholane, etc. In general, a catalyst can be employed in an amount of about 0.1 equivalents or less according to the hydroxyl content of the polyol; for instance, about 0.05 equivalents in one embodiment.

The reaction of an organic carbonate with a polyol can be highly temperature sensitive. For instance, at temperatures near Kraft pulping conditions (about 170° C.), the ether bond linkages throughout lignin's structure can be broken setting in motion a cascade of reactions involving highly reactive lignin fragments. As such, the conditions of the oxyalkylation reaction, including catalyst loading, reaction temperature, and reaction time period, have been developed so as to balance the condensation of the polyol structure (which can lower hydroxyl content and increase molecular weight of the polyol) with fractionation of the polyol backbone (leading to lower molecular weight derivatives). It has been found that a desirable balance can be struck by carrying out the oxyalkylation chain extending reaction at a relatively low temperature, generally about 160° C. or less, or from about 130° C. to about 155° C., e.g., about 150° C. in some embodiments and for a relatively short period of time, from about 1 hour to about 2 hours, or about 1.5 hours in some embodiments. Use of higher temperatures and/or longer reaction times have been found to lead to excessive polycarbonate condensation and generally unprocessable materials.

Over the course of the oxyalkylation reaction, the molecular weight of the polyol feedstock can decrease, which is evidence of the good balance between condensation and fractionation that can be attained by the reaction. For instance, the weight average molecular weight ($M_w$) of the oxyalkylated polyol can be about 90% or less of that of the polyol of the feedstock; for instance, about 80%, or less or about 70% or less. In some embodiments, the $M_w$ of the oxyalkylated polyol can be from about 50% to about 70% of the $M_w$ of the polyol feedstock.

Following an oxyalkylation reaction step, the oxyalkylated polyol, which has a 1,2-diol functionalized structure, can be further processed to insert cyclocarbonate structures on the backbone. This can be carried out by a transesterification reaction of the oxyalkylated polyol with a second organic carbonate. The organic carbonate of the transesterification reaction can be the same as or different from the organic carbonate utilized in the oxyalkylation reaction. For instance, in one embodiment, a cyclic organic carbonate (e.g., glycerol carbonate) can be utilized in the oxyalkylation step and a non-cyclic carbonate, e.g., dimethyl carbonate, can be used in the transesterification reaction so as to insert 5-member cyclocarbonate structures on the backbone of the polyol. Of course, other combination of carbonate reactants as described previously can likewise be utilized.

The organic carbonate of the transesterification reaction step can generally be provided in an amount of from about 3 equivalents to about 10 equivalents, based upon the hydroxyl content of the polyol; for instance, about 5 equivalents organic carbonate according to the hydroxyl content of the polyol, in one embodiment.

As with the initial oxyalkylation reaction, tight control of the catalyst loading, reaction temperature, and reaction time can be utilized to provide a bio-based precursor that can exhibit high reactive functionality content that is available for curing during polyurethane polymerization reactions. For instance, an alkaline catalyst can be used including, without limitation, alkali-metal hydroxides, such as potassium, sodium or lithium hydroxides; salts of an alkali-metal and a weak acid, such as sodium carbonate, potassium carbonate, etc.; alkaline salts such as trisodium phosphate; alkali-metal alcoholates, such as sodium methoxide, potassium ethoxide, sodium ethoxide; organic bases, such as the quaternary ammonium bases, including the mixed alkyl-dimethyl-benzyl ammonium hydroxides, the alkyl-trimethyl ammonium hydroxides and tetra-alkyl quaternary ammonium hydroxides, such as tetramethylammonium hydroxide, cetyldimethylbenzyl-ammonium hydroxide, etc.; or the alkali metal sucrates or raffinates, such as sodium sucrate, sodium, raflinate, etc. Additionally, metals, such as tin and zinc, may be employed as catalyst for the transesterification reaction.

The catalyst of the transesterification reaction step can generally be provided in an amount of about 1 equivalents or less, based upon the hydroxyl content of the polyol; for instance, from about 0.2 equivalents catalyst to about 0.7 equivalents, or about 0.4 equivalents according to the hydroxyl content of the polyol, in one embodiment.

The transesterification cyclic carbonate insertion reaction can be carried out at a temperature of about 100° C. or less, or from about 60° C. to about 90° C., e.g., about 75° C. in some embodiments and for a period of time from about 3 hours to about 6 hours, or about 4 hours in some embodiments.

It should be understood that bio-based cyclocarbonate precursors formed according to other methodologies can be utilized in disclosed processes and products, for instance in combination with a bio-based cyclocarbonate precursor formed according to a two-step oxyalkylation/transesterification process as described above, with other bio-based cyclocarbonate precursors, with other non-bio-based precursors, or as the only cyclocarbonate precursor of a polyurethane formation process, as desired. By way of example, a linear or branched cyclocarbonate precursor formed from a bio-based polyfunctional acid (e.g., a dicarboxylic acid) can be utilized in some embodiments in formation of a polyurethane with particular characteristics.

In some embodiments, a cyclocarbonate can be provided through reaction of an acid, e.g., a bio-based organic acid, with a carbonate, e.g., a bio-based glycerol carbonate as described above. For instance, a fatty acid, a triglyceride, polyol, or the like such as may be derived from an animal or plant source as discussed previously, e.g., vegetable oils such as soy, rapeseed, corn, cottonseed, olive oil, castor oil, mahua oil, or perilla oils, algal oils, animal fats or oils, etc. can be processed to form a linear or branched acid, e.g., a C4 to C10 linear or branched bio-based acid, that can then be reacted with a carbonate to form a cyclocarbonate precursor that may be utilized in conjunction with one or more other bio-based precursors, e.g., a lignin-based precursor, in forming a polyurethane with well-defined characteristics.

A bio-based precursor can have high reactivity. For instance, a bio-based precursor can have a cyclic carbonate content of from about 1.8 mmol cyclic carbonate per gram total polyol or greater, such as from about 1.8 to about 2.25 mmol cyclic carbonate per gram starting polyol, or about 2 mmol cyclic carbonate per gram polyol in one embodiment. In addition, the cyclic carbonate can be accessible to a curing agent during a polyurethane formation process, which can be evidenced by the molecular weight of the bio-based precursor as it can be lower than the molecular weight of the polyol feedstock utilized to form the precursor. For instance, the $M_w$ of the bio-based precursor can be from about 70% to about 95% of the $M_w$ of the polyol of the feedstock, or from about 80% to about 90% in some embodiments, such as about 85%. By way of example, the bio-based precursor can have a weight average molecular weight of about 15,000 or less, about 14,500 or less, or about 14,000 in some embodiments.

Likewise, the number average molecular weight ($M_n$) of the bio-based precursor can be lower than that of the polyol of the feedstock; for instance, $M_n$ of the bio-based precursor can be about 90% or less of that of the polyol feedstock; for instance, about 80% or less, or about 70% or less. In some embodiments, the $M_n$ of the precursor can be from about 50% to about 70% of the $M_n$ of the polyol feedstock. By way of example, the bio-based precursor can have a number average molecular weight of about 4,000 or less, about 3,500 or less, or about 3,400 in some embodiments.

The lower molecular weight of a precursor as compared to the polyol feedstock upon which it is based can be of particular benefit as it can enable the capability of the precursor to be solubilized in the curing agent with a small amount of a solvent, e.g., a green solvent such as dimethylsulfoxide (DMSO). As previously mentioned, the biobased precursors can also exhibit very high bio-based carbon content, e.g., about 95% or greater; for instance, in those embodiments in which the carbonate(s) are derived from bio-based sources.

To form a polyurethane by use of the bio-based precursors, a diamine can be reacted with one or more precursors and incorporated as soft segments throughout the NIPU structure with the bio-based precursor(s) incorporated as hard segments. In one embodiment, the diamine can be a bio-based diamine, and in one particular embodiment, a fatty acid based polyvalent, e.g., dimer, diamine. In one embodiment, the diamine component can be composed of 100% bio-based carbon, e.g., a 100% bio-based carbon fatty acid dimer diamine. Beneficially, a polyurethane formation protocol can in one embodiment be free of the use any polyhydric alcohol or petroleum-based chain extenders, which can increase the bio-based carbon content of the formed polyurethane.

In one embodiment, the diamine component can be represented by the following structure:

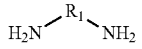

in which $R_1$ may include a C1 to C20 linear alkyl group.

In one embodiment, the diamine component can be a polyvalent diamine represented by the following structure:

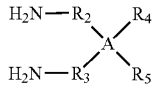

in which A is a tetravalent saturated hydrocarbon residue, and may be a linear structure or a ring structure; for instance, a C1 to C4 linear structure, $R_2$ and $R_3$ are an alkylene group, e.g., a C1 to C20 alkylene group, and $R_4$ and $R_5$ are a linear alkyl group, e.g., a C1 to C20 linear alkyl group.

For instance, and without limitation, $R_2$ and $R_3$ can be selected from methylene, ethylene, propylene, butylene, pentylene, etc. and may be the same or different from each other. $R_4$ and $R_5$ can be selected from, and without limitation to, methyl, ethyl, propyl, butyl, a pentyl etc. and $R_4$ and $R_5$ may be the same or different from each other.

In some embodiments, the carbon chain(s) of the diamine can be relatively long; for instance, a C14 to C18 alkyl chain. The aliphatic nature of the carbon chain present in the structure of the diamine can provide soft segments to the NIPU/NIPUF structure and can temper the brittle and rigid nature of an aromatic backbone of the bio-based precursor.

In one embodiment, the diamine can be a bio-based diamine derived from a fatty acid. For instance, and as indicated in FIG. 1, a bio-based fatty acid dimer diamine can be formed by reductive ammonolysis of dimer fatty acids produced as an animal processing by-product. As utilized herein, the term "fatty acid" generally refers to naturally occurring and synthetic monobasic aliphatic acids having hydrocarbon chains of 8 to 24 carbon atoms. Fatty acids can include saturated, ethylenically unsaturated and acetylenically unsaturated acids.

The diamine can be a diamine of a polyvalent fatty acid. As utilized herein, the term "polyvalent fatty acid" generally refers to dimerized fatty acids, trimerized fatty acids and higher polymers of fatty acids, respectively. The saturated, ethylenically unsaturated, and acetylenically unsaturated fatty acids are generally polymerized by somewhat different techniques, but because of the functional similarity of the polymerization products, they are all generally referred to as "polyvalent fatty acids."

For instance, saturated fatty acids can be polymerized at elevated temperatures with a peroxidic catalyst such as di-t-butyl peroxide to form a polyvalent fatty acid, e.g., a dimer fatty acid. Exemplary saturated fatty acids as may be utilized in forming a fatty acid diamine include branched and straight acids, such as caprylic acid, pelargonic acid, capric acid, lauric acid, myristic acid, palmitic acid, isopalmitic acid, stearic acid, arachidic acid, behenic acid and lignoceric acid.

The polyvalent, e.g., dimerized, fatty acid can be converted to the corresponding dinitrile by reacting the dimerized fatty acid with ammonia under nitrile forming conditions as is known in the art. The dinitrile can then be purified by vacuum distillation or other suitable means. After such purification, the dinitrile can be hydrogenated to form the dimer diamine which can also be purified by vacuum distillation or other suitable means.

Of course, the diamine for use in reaction with a bio-based precursor is not limited to fatty acid diamines, or fatty acid dimer diamines, and other diamines as are known in the art can be utilized, though use of such may lower the bio-based carbon content of a polyurethane product, depending upon the source materials used in forming the diamine. Examples of the diamines that can be utilized can include, but are not limited to, ethylene diamine, 1,2- and 1,3-propylene diamine, tetramethylene diamine, hexamethylene diamine, octamethylene diamine, 1,2-diaminocyclohexane, 1,3-bis (aminomethyl)cyclohexane, decamethylene diamine, N,N'-dibutyl hexamethylenediamine, N,N'-dimethyl hexamethylenediamine, N,N'-dihexyl hexamethylenediamine, 1,12-dibutylaminododecane, 1,10-dibutylaminodecane, N,N'-didodecyl hexamethylenediamine, N,N'-dibutyl butylenediamine, N,N'-dibutyl ethylenediamine, N,N'-diisobutyl butylenediamine, and combinations thereof. As a commercial example, Priamine™ (available from Croda Japan Co., Ltd.) is mentioned.

Figure 7:
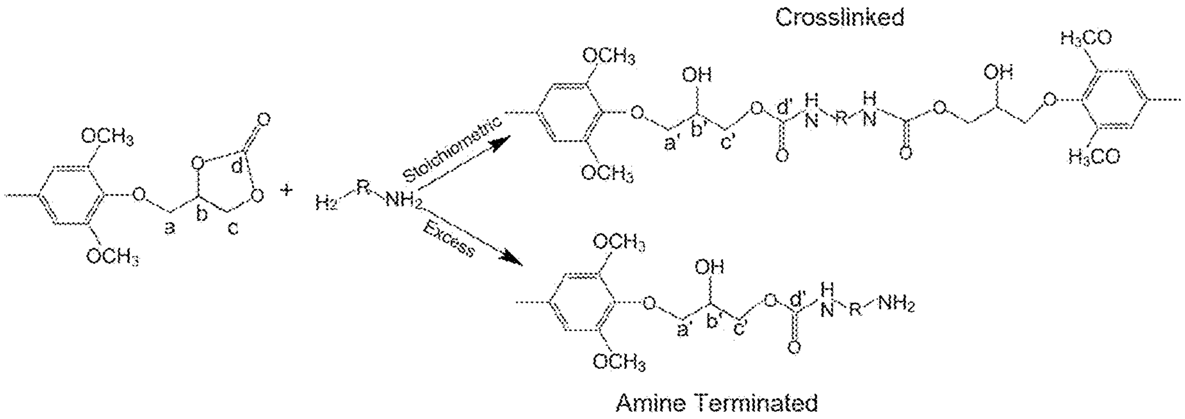
FIG. 7 provides reaction schemes of cyclocarbonated lignin with difference stoichiometries of diamine curing agent leading to a change in crosslinking density.

The relative amount of a diamine curing agent used with reference to the bio-based precursor can vary as in traditional polyurethane formation protocols. For instance, a stoichiometric amount of diamine can lead to a maximum amount of crosslinking while excess diamine can terminate the crosslinking reaction by creating amine-terminated derivatives, as schematically illustrated in FIG. 7.

A catalyst used in a curing reaction can generally be a typical catalyst used in standard amounts, e.g., about 1 equivalent or less, about 0.5 equivalents or less, or about 0.3 equivalents or less, such as from about 0.05 to about 0.2 equivalents or about 0.1 equivalents in one embodiments, based upon the cyclocarbonate content of the system. In one embodiment, organic catalysts as mentioned previously, e.g., TBD can be utilized in a polyurethane formation reaction.

As mentioned previously, reaction conditions discovered in formation of bio-based precursors have been found to produce a functionalized precursor molecule of small enough molecular weight that allows easy compatibilization with a diamine, e.g., a fatty acid-based diamine. The protocol can be an extremely environmentally friendly approach to produce soluble bio-based precursors as compared to previously known approaches, e.g., dissolution in polyhydric alcohols or polypropylene oxide, significantly reducing the bio-based carbon content of cured materials, or the use of chlorinated and toxic solvents such as dichloromethane, tetrahydrofuran, or dioxane.

Bio-based precursor(s) as disclosed herein can also react with the diamine curing agent with fast kinetics; for instance, with a gel time of an uncatalyzed system of about 15 minutes or less, about 10 minutes or less, or about 8 minutes in some embodiments; and with a gel time of a catalyzed system of about 10 minutes or less, about 5 minutes or less or about 3 minutes in some embodiments.

Reaction temperatures of a curing reaction can generally be about 120° C. or higher in some embodiments, e.g., about 150° C. for complete conversion of the cyclocarbonate groups to urethane linkages. Lower reaction temperature are possible; however, they may lead to some unreacted groups and, as such, lower performing NIPU materials.

NIPU formed with a stoichiometric amount of curing agent (1:1 ratio between cyclocarbonate groups and amine units on the diamine) can exhibit an ultimate strength value of from about 10 MPa to about 25 MPa, an ultimate strain value of from about 10% to about 50%, and a tensile modulus of from about 135 MPa to about 450 MPa. Tensile characteristics may be determined according to ASTM D638. Utilization of higher ratios of diamine curing agent can incorporate larger proportions of the diamine-based soft segments in the polymeric structure leading to an increase in ultimate strain and a corresponding decrease in modulus.

An NIPU can also have a high density, for instance, about 1000 $kg/m^3$, independent of the relative amount of curing agent utilized in the curing reaction. An NIPU formed as described can also be thermally stable, with a 5% wt. loss temperature of from about 300° C. to about 350° C., e.g., about 330° C. As discussed previously, an NIPU formed as described can also have a high bio-based carbon content, such as about 90% or greater.

The excellent compatibilization capable with the bio-based precursors is also evident through examination of the average molecular weight between crosslinks. For instance, in a polyurethane formed with a stoichiometric amount of diamine, the average molecular weight between crosslinks can be about equivalent to the molecular weight of the diamine curing agent (whether $M_w$ or $M_n$). In an embodiment in which an excess of diamine is used, the average molecular weight between crosslinks will increase as a consequence of the incorporation of a larger amount of amine terminated polyol species interacting through hydrogen bonding.

The excellent kinetics of a curing reaction of a bio-based precursor can allow for formation of NIPUF, as a curing reaction between cyclic carbonate functionalization of the bio-based precursors and a diamine can be on a timescale equivalent to a foaming reaction. As is known, the gel time of a polyurethane is a very important aspect of its processability and the ability to cure on time-scales commensurate with foaming reactions. Rheology can indicate the gel time of a polymer by monitoring a sharp increase in the elastic modulus, as well as the crossover point between elastic and storage moduli, referring to the point where the reaction mixture takes on solid rather than liquid mechanical characteristics.

The fast gelation times of disclosed systems mentioned previously are surprising due to expected low reactivity between cyclocarbonates and diamines. The fast reaction time of the disclosed methods gives evidence to the successful ability of using organic carbonates as benign reagents to make more reactive precursors. Without wishing to be bound to any particular theory, this is believed to be due to the precursor formation process that extends the nascent hydroxyl groups beyond the structure of a polyol backbone, e.g., a complicated polyol structure such as a lignin backbone, which prevents the cyclocarbonate groups from remaining sterically hindered from participating in the curing reaction.

To prepare an NIPUF, the curing reaction can incorporate a physical or chemical foaming agent. In general, any physical or chemical foaming agent as is known in the art can be utilized including, without limitation, physical foaming agent, such as supercritical $CO_2$ or sodium bicarbonate or chemical foaming agents such as poly(methylhydrosiloxane) (PMHS), by which the curing agent can react with the blowing agent to release hydrogen gas and induce foaming.

In one embodiment, a NIPUF can be formed by use of a delayed addition of a foaming agent. In this approach, a time interval of about 1 minute, for instance, from about 1 to about 2 minutes following combination of the bio-based precursor with the curing agent prior to addition of the foaming agent, which can allow the crosslinking reaction to progress in the NIPU formulation for a period prior to the initiation of foaming. A delayed addition approach is not required for production of a NIPUF as described, and in other embodiments, a foaming agent can be added in conjunction with (or prior to) addition of a curing agent.

The amount of foaming agent incorporated can vary as is known in traditional polyurethane foam processing, with a higher amount of foaming agent generally leading to a lower density foam. Moreover, the characteristics of the foaming agent (e.g., chemical/physical), as well as the reactant used in a chemical foaming reaction, can affect the preferred amount of foaming agent. In general, however, a foaming agent can be added in an amount of from about 1 vol. % or less, e.g., about 0.5 vol. % compared to reaction mixture volume to provide a relatively low density foam, e.g., about 100 $kg/m^3$ or less, about 50 $kg/m^3$ or less, or about 30 $kg/m^3$ or less in some embodiments, e.g., from about 50 $kg/m^3$ to about 80 $kg/m^3$, or from about 70 $kg/m^3$ to about 100 $kg/m^3$ in some embodiments. A foaming agent can generally be added in an amount of about 1 vol. % or higher relative to reaction mixture volume to provide a higher density foam, e.g., about 100 $kg/m^3$ or greater, e.g., about 100 $kg/m^3$ to about 900 $kg/m^3$, about 100 $kg/m^3$ to about 500 $kg/m^3$, about 105 $kg/m^3$ to about 150 $kg/m^3$, or about 110 $kg/m^3$ to about 130 $kg/m^3$ in some embodiments.

In one embodiment, utilization of a PMHS chemical foaming agent in an amount from about 1 vol. % to about 3 vol. % compared to reaction mixture volume with additional diamine curing agent added in stoichiometric proportion to the foaming agent can provide a NIPUF formed with a lignin-based precursor as the only cyclocarbonate precursor of the polyurethane having a density of from about 200 $kg/m^3$ to about 350 $kg/m^3$. Foam density values can be determined according to ASTM D1622.

The characteristics of an NIPUF can also be varied through selection of precursors, curing agents, etc., as is known in the art. For instance, combination of a highly branched precursors, such as that based upon lignin, with a linear precursor, e.g., a linear cyclocarbonate precursor, can be utilized to provide a NIPUF having desirable and targeted characteristics.

The viscosity of an NIPUF reaction mixture is an important parameter to allow bubble coalescence during the foaming reaction, thereby increasing the porosity of the sample. The reaction mixture viscosity can vary depending upon the type and amount of solvent used in the reaction mixture. Beneficially, disclosed materials can form reaction mixtures with desirable viscosity at relatively low solvent add-in. For instance, a reaction mixture can include a solvent in a ratio of about 1.5 mL solvent or less per gram of bio-based precursor, e.g., about 1.3 mL per gram bio-based precursor in some embodiments. The solvent used is not particularly limited, but in one embodiment, a non-toxic solvent such as dimethyl sulfoxide (DMSO) can be used, which can increase the safety and environmental performance of a product.

The viscosity of the reaction mixture can also affect the formation of open vs closed cell foams, with a lower viscosity reaction mixture leading to formation of a more open cell structure. Specifically, more cellular rupture occurs as the lamellar layer is thinner with lower viscosity reaction mixtures. The reaction mixture viscosity can be modified through modification of the content of the solvent, as well as through modification of the amount of the diamine curing agent. For instance, higher content of a low viscosity diamine curing agent in a reaction mixture, which is beneficial in utilization of a chemical foaming agent such as PMHS that reaction with the diamine, can decrease the reaction mixture viscosity, leading to increased open cell content in the NIPUF.

The compressive strength at 10% strain of disclosed NIPUF can meet or exceed typical desired thresholds of commercial rigid PUF. For instance, NIPUF as described can exhibit a compressive strength at 10% strain (as may be determined according to ASTM D1621) of about 80 kPa or greater, or about 100 kPa or greater in some embodiments, such as from about 110 kPa to about 170 kPa.

Bio-based NIPUF as disclosed herein can exhibit other desirable qualities as well. For instance, an NIPUF can exhibit an Asker C hardness as determined according to ASTM 2240 of from about 20 to about 30, for instance from about 21 to about 29, from about 22 to about 27, or about 25 in some embodiments.

Bio-based NIPUF can exhibit desirable strength qualities as well, for instance a tensile strength of from about 2 $kg/cm^2$ to about 10 $kg/cm^2$, such as from about 3 $kg/cm^2$ to about 8 $kg/cm^2$, or about 5 $kg/cm^2$ in some embodiments, as may be determined according to ASTM D3574E; a tear strength as may be determined according to ASTM D3574F of from about 1 kg/cm to about 5 kg/cm, such as about 2 kg/cm in some embodiments; and a split strength of from about 0.1 kg/cm to about 3 kg/cm, such as about 0.2 kg/cm to about 2 kg/cm, or about 0.5 kg/cm in some embodiments.

A bio-based NIPUF can exhibit elongation in some embodiments, such as an elongation of greater than about 50%, e.g., from about 50% to about 150%, from about 75% to about 125%, or about 100% in some embodiments. Tensile elongation values can be determined according to ASTM 3574E.

A biobased NIPUF can exhibit desirable compression characteristics, such as a compression set of from about 5% to about 40%, from about 10% to about 30%, or about 20% in some embodiments; shrinkage of less than about 5%, such as from about 0.5% to about 3%, or about 1% in some embodiments; and resiliency of from about 20% to about 50%, such as about 25% to about 40%, or about 28% to about 32% in some embodiments. Compression, shrinkage, and resiliency characteristics may be determined according to ASTM 3574, e.g., ASTM 3574N and ASTM 3574H.

In addition to other benefits, high bio-based carbon content NIPU and NIPUF described herein can exhibit excellent recyclability capability. Without wishing to be bound to any particular theory, it is believed that the use of organic carbonate in the initial chain extension reaction of the polyol feedstock not only extends nascent hydroxyl groups but also creates additional ether and carbonyl groups on the backbone of a polyol that are capable of being used in subsequent chemical recycling steps as "molecular zippers" that can provide a route to not only breaking down the formed polyurethane in a degradation reaction, but also retrieving the precursor materials in a high quantity so as to provide a circular lifecycle to use the recycled precursors in the same or other applications. For instance, using a hydrolysis recycling technique including processing at a temperature of from about 200° C. to about 250° C. for reaction periods of from about 1 to 6 hours, bio-based NIPU/NIPUF can be treated to recover from about 60 wt. % to about 85 wt. % of lignin and convert from about 60 wt. % to about 75 wt. % of the total polyurethane waste material. A combined hydrolysis/glycolysis recycling technique can utilize a reaction system including a stabilizer such as ethylene glycol, formaldehyde, or bio-based alcohols in an amount of about 5-20 wt. % (e.g., 10 wt. %), and an alkaline catalyst such as a potassium hydroxide solution at from about 0.05 M to about 2.5 M (e.g., 1 M-2 M) at a reaction temperature of from about 200° C. to about 250° C. for reaction periods of from about 1 to 6 hours, bio-based NIPU/NIPUF can be treated to recover from about 70 wt. % to 100 wt. % of lignin and convert from about 70 wt. % to about 95 wt. % of the total polyurethane waste material Moreover, the natural degradation pathways present in the structure of polyols such as lignin have been shown to create unique handles that can undergo chemical conversion and degradation with the application of hydrolysis.

The presence of two phases in the polymer structure can also result in shape memory characteristics of both the NIPU and the NIPUF formed as described. Shape memory polyurethanes can be useful in a variety of applications in sensors, actuators and smart materials, among others. Shape memory polymers typically contain hard segments responsible for the permanent morphology of the sample while soft segments allow deformation of the sample shape above the $T_g$ of the polymer. When the temperature is lowered below $T_g$, and the external stress is released, the sample retains the deformed shape due to the interaction between soft-segment polymer strands.

The utilization of renewable biomass as feedstock in polymer synthesis, as well as in chemical conversion technologies for the utilization of waste products, can create a truly renewable polyurethane lifecycle. In addition to the environmental benefits, the utilization of low-cost waste feedstocks can increase the economic outlook of these materials. Moreover, due to the "tunability" of disclosed materials with regard to physical characteristics including softness, stiffness, strength, etc., the materials can be utilized in any of a wide variety of end-use applications such as, and without limitation to, packaging, e.g., food packaging, cushioned packaging, flexible packaging; construction materials, e.g., structural foams, insulation, sealants; shipping materials, e.g., shipping container insulation, supports, sealants; packing materials; vehicle materials, e.g., roof liners, seat cushions, insulation; personal care products, e.g., joint wraps and supports, shoe inserts and liners; furniture, e.g., seating materials, cushions, padding; etc.

The present disclosure may be better understood with reference to the Examples set forth below.

EXAMPLES

Materials and Methods

Kraft lignin was supplied by Domtar under the trade name "BioChoice® Lignin". BioChoice® is a low ash content lignin (~1%) and was dried before use. The curing agent was provided by Croda under the trade name "Priamine™ 1074". Priamine™ is a dimer diamine with amine value of 209 mg KOH/g. Glycerol carbonate (DMC) was purchased from Spectrum Chemical or InKemia Green Chemicals with a minimum purity of 90%. Dimethyl carbonate (>99.0%), dimethylsulfoxide-d6 (DMSO-d6, 99.96 atom % D), 1,8di-azabicyclo[5.4.0]undec-7-ene (DBU, 98%), 1,5,7-triazabi-cyclo[4.40]dec-5-ene (TBD, 98%), 2-chloro-4,4,5,5-tetramethyl-1,3,2-dioxaphospholane (95%), 1,3,5-trioxane (>99%), cholesterol (>99%), chromium (III) acetylacetonate (97%) and poly(methylhydrosiloxane) (PMHS) was purchased from Millipore Sigma. DMSO (99%) for reactions was purchased from VWR.

Infrared spectra were collected by a Thermo Scientific™ Nicolet™ 6700 Spectrometer from 500-4500 cm-1 using 16 scans with a 2 cm-1 spectral resolution. All NMR experiments were completed by a Bruker AVANCE 300 MHz Spectrometer. 1H NMR was taken after dissolving 30 mg of lignin samples in 0.55 ml of DMSO-d6. 32 scans were completed using a spectral width of 5342 Hz. 13C NMR was completed by dissolving 70-80 mg of lignin samples in 0.55 ml of DMSO-d6 with 50 μL of a 15 mg/ml solution of trioxane as internal standard. Chromium (III) acetylacetonate was used as relaxation agent with a spectral window of 18,110 Hz and 20,000 scans. 31P NMR analysis was completed using 2-chloro-4,4,5,5-tetramethyl-1,3,2-dioxaphospholane as phosphorylating agent in a 1.6/1 solution of pyridine and chloroform-d according to established procedures. Cholesterol was used as an internal standard and Cr (III) as relaxation agent. CP/MAS SS 13C NMR was conducted using a Bruker AV3-400 instrument with a spectrometer frequency of 100 MHz and a magical angle spinning frequency of 10 KHz. The molecular weight of lignin precursors was measured using GPC (Alliance GPCV 2000) with two columns used in series: first a Waters Styragel® HT5 followed by an Agilent PolarGel-L column. Lignin was dissolved in N,N-dimethylformamide at 1 mg/ml in 0.05 lithium bromide. The mobile phase was filtered using a 0.2 mm nylon filter. PEG calibration standards were used in tandem with a Waters differential refractometer. Lignin samples were detected by a Waters 2487 UV-Vis detector at 280 nm.

Tensile testing was completed on dog bone shaped samples created in silicon molds and tested on an Instron 1125R with a 1 kN load cell at 5 mm/min. Compression testing was completed on an Instron® 5582 with 1 kN load cell at a compression rate of 10 mm/min. Samples were cut from conical molds to cubes of approximate dimensions of 25 mm×25 mm×10 mm (depending on rise height). Modulus was calculated for both tensile and compression samples based on the initial slope of the stress-strain graph. Three to five samples for tensile testing and five samples for compression testing were averaged and used for statistical analysis with error reported as the standard deviation. Dynamic mechanical analysis was completed on a TA Instruments Q800 DMA using a fiber/film tension clamp under single cantilever mode. A temperature sweep was analyzed from −50° C. to 150° C. at a frequency of 5 Hz and 0.3% max strain.

Thermogravimetric analysis (TGA) was completed on a TA Instruments Q5000 using a 20° C./min heating rate from 25° C. to 600° C. under a mixture of nitrogen and air. Dynamic Scanning calorimetry was completed on a TA Instruments Q20 during a heat-cool-heat cycle at 5° C./min with 50 mm/min nitrogen purge. The glass transition temperature was calculated based on the midpoint of the change in slope of heat flow vs. temperature. Curing rheology was studied on a Discovery HR-2 rheometer (TA Instruments) using a 25 mm parallel plate geometry. The rise in loss and storage moduli were observed using a time sweep under isothermal condition at 80° C., 1% strain and an angular frequency of 10 rad/sec.

Example 1

Non-toxic glycerol carbonate (GC) was used as solvent and reagent in the oxyalkylation of Kraft lignin. Kraft lignin (6.1 mmol OH/g) was mixed in a round bottom flask with 10 equivalents of GC (MW=118.09 g/mol) according to the hydroxyl content of lignin. The catalyst was added in 0.1 equivalents and the reaction was conducted under a nitrogen atmosphere at 150° C. for 1.5 hours. When the reaction was completed the mixture was allowed to return to room temperature and the product was precipitated in a dilute HCl solution until the pH reached a value below 2. The precipitated lignin product was washed with the acidified water, filtered, and dried under vacuum over $P_2O_5$ overnight.

The oxyalkylated Kraft lignin (OKL) having a 1,2-diol functionalized structure underwent a transesterification reaction with dimethyl carbonate (DMC) to insert 5-member cyclocarbonate structures on the lignin backbone. OKL (4.7 mmol/g) was dissolved in DMSO and 5 equivalents of DMC was added along with 0.4 equivalents of the catalyst $K_2CO_3$. The reaction was completed for 4 hours under nitrogen at 75° C. After the reaction was completed, the product was precipitated, filtered, and dried as above.

Figure 3:
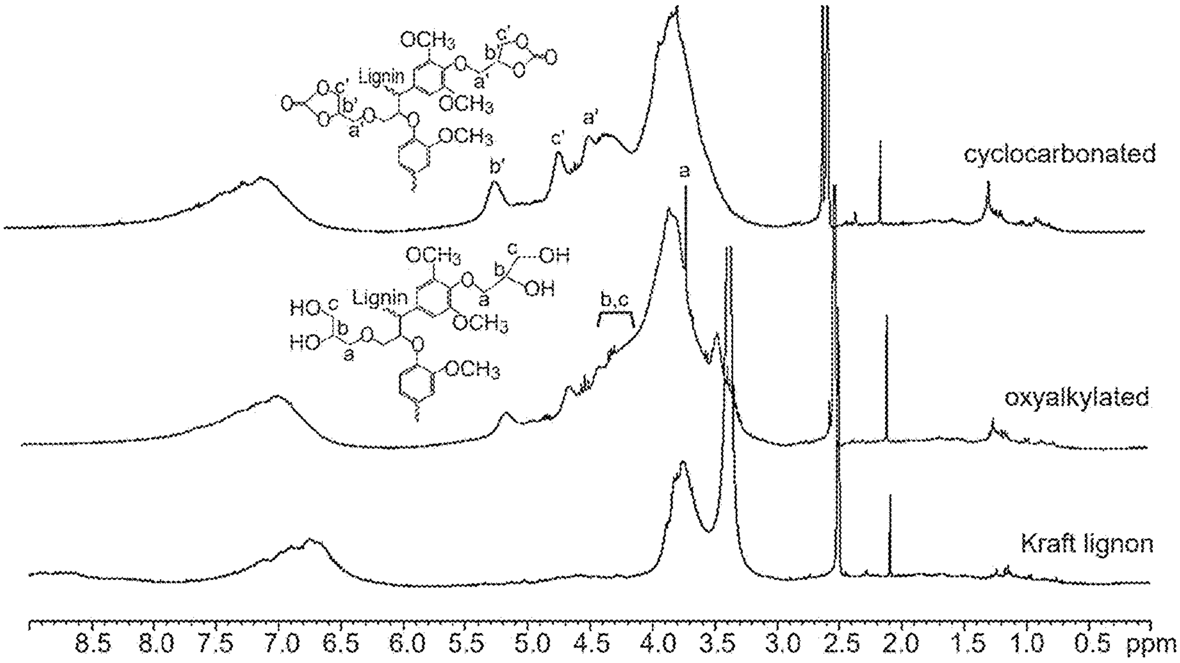
FIG. 3 presents $^{1}H$ NMR of oxyalklyated lignin after reaction with glycerol carbonate and a subsequent reaction with dimethyl carbonate (cyclocarbonated lignin).
Figure 4:
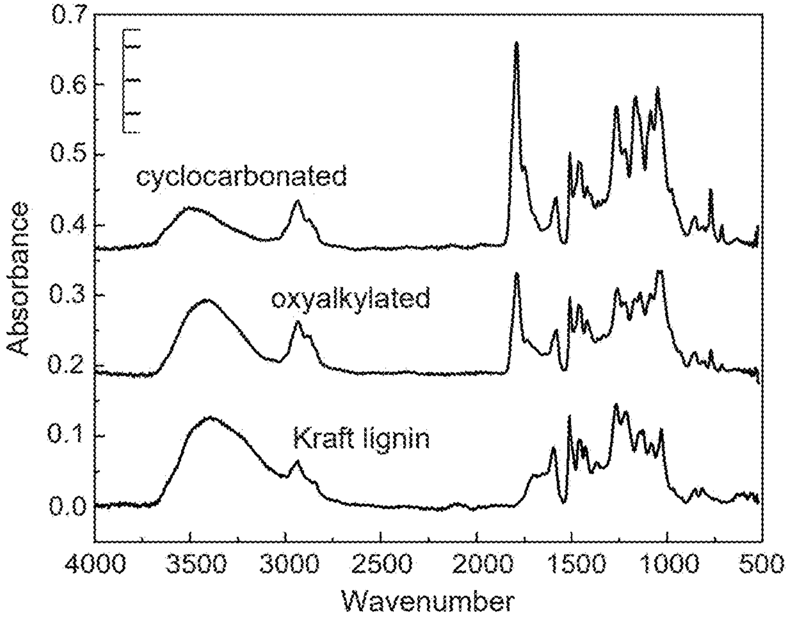
FIG. 4 presents FTIR of lignin and functionalized lignin-based precursors.

The reaction of lignin-derived OH groups with organic carbonates reacted at both the carbonyl and alkyl carbons forming carbonate and ether linkages, respectively. The spectroscopic evidence (FIG. 3, FIG. 4) supports the incorporation of chain extended lignin macromers containing both types of liable groups, creating molecular handles that could be used in the chemical recycling of polymers at a later time. In FIG. 3, the appearance of the sharp peak at 3.5 ppm results from the addition of the methylene groups of oxyalkylated strands while the peaks from 4-5 ppm refer to protons in the cyclocarbonate ring. As shown in FIG. 4, the functionalization of Kraft lignin with glycerol carbonate (oxyalkylated) created an increase in signal intensity corresponding to the C—O stretching (1000-1100 $cm^{-1}$) of etherified strands, as well as increased signals in the carbonyl region reflecting both the presence of linear and cyclocarbonates (1700, 1720 $cm^{-1}$ respectively). The subsequent reaction with dimethyl carbonate produced a noticeable increase in the cyclocarbonate peak as a result of a ring-closing transesterification reaction.

The characteristics of the starting Kraft lignin, the intermediate OKL, and the cyclocarbonated lignin (CCL) are shown below in Table 1.

TABLE 1

| Sample | Aliphatic —OH (mmol/g) | Aromatic —OH (mmol/g) | Carboxylic Acid (mmol/g) | Total OH Content (mmol/g) | Mw | Mn | PDI |
|---|---|---|---|---|---|---|---|
| Kraft Lignin | 2.05 | 3.53 | 0.51 | 6.11 | 16,558 | 5,142 | 3.2 |
| OKL | 4.73 | 0 | 0 | 4.73 | 10,400 | 2,911 | 3.6 |
| CCL | 1.51 | 0 | 0 | 1.51 | 14,023 | 3,396 | 4.1 |

The overall hydroxyl content was used to measure reagent equivalents in the reaction with GC. Initial reactions using 10 equivalents of GC, 0.1 equivalents of the catalyst DBU at 170° C. for 3 hours often produced dark, glassy materials characteristic of polycarbonate condensation between KL and GC. Lowering the temperature to 150° C., while keeping reaction time the same, still resulted in material showing substantial insolubility and unable to process. However, reducing the reaction time to 1.5 hour and lessening the catalyst loading to .05 equivalents produced a product completely soluble in DMSO and capable of characterization and further synthetic efforts. It was observed that the reaction of GC with Kraft lignin was highly temperature sensitive and, as expected, near Kraft pulping conditions (170° C.) the ether bond linkages throughout lignin's structure were broken, setting in motion a cascade of reactions involving highly reactive lignin fragments. Under higher catalyst loadings and longer reaction times an increase in evolved gas ($CO_2$) was observed pointing to the reaction of additional GC on the backbone of lignin. Recovery of lignin after such reactions became increasingly difficult as the lignin polyol had a much higher solubility in the aqueous media.

Figure 5:
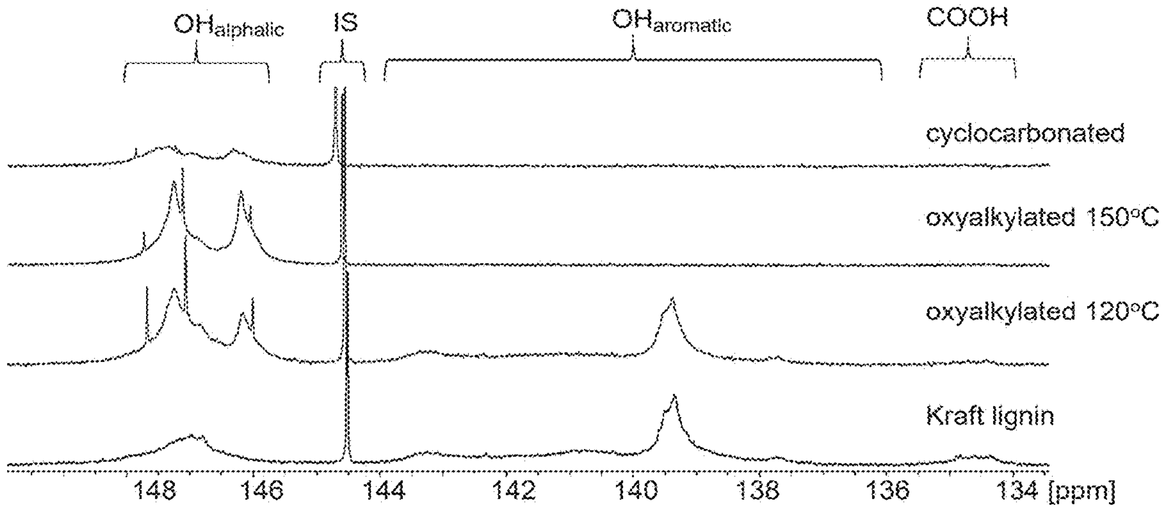
FIG. 5 presents $^{31}P$ NMR of Kraft lignin and functionalized lignin-based precursors formed according to disclosed methods.

The evidence of a complete reaction of aromatic hydroxyls with GC was followed by $^{31}P$ NMR through the disappearance of the aromatic signal from 136-144 ppm (FIG. 5). New peaks appeared in the aliphatic region from 145.5-146.5 ppm corresponding to the conversion of aromatic hydroxyls to newly formed aliphatic hydroxyl groups. Interestingly, when the reaction was completed at 120° C., evidence of an incomplete reaction was seen by the persistence of aromatic hydroxyl groups between 137-140 ppm. Unfortunately, the direct quantification of grafted chains using 31P NMR was not possible due to the existence of side reactions during the oxyalkylation step.

Table 1 shows that the molecular weight of OKL slightly decreased from unfunctionalized Kraft lignin with a corresponding decrease in hydroxyl content. In addition to the reaction of the aromatic hydroxyl groups, the conversion of native aliphatic hydroxyl groups could be seen by new, sharp peaks formed in the aliphatic region between 147-148 ppm (FIG. 5). Given the evidence for successful functionalization of aliphatic and aromatic hydroxyl groups, as well as the solubility and processing ability of the 150° C., 1.5-hour sample, these conditions were used for all subsequent synthetic efforts.

1H NMR also confirmed the successful insertion of oxyalkylated chains, with a sharp peak appearing at 3.7 ppm, associated with the alkyl protons of the newly grafted carbon chains and the disappearance of the phenolic protons from 8-10 ppm in the unfunctionalized lignin (FIG. 3). Signals appeared in the region for cyclocarbonate protons (4-5 ppm) even during the first stage with GC, most likely a result of a transesterification reaction with excess GC in the reaction mixture. Since the newly formed peaks for the oxyalklyated chains overlap with existing signal from unreacted lignin, quantification was difficult. However, integrating the total signal from all hydrogen associated with the methylene and methoxy region present between 3.5 to 4.5 ppm in FIG. 3, and comparing this result to the aromatic signal present from 8 to 10 ppm, an average of 12 additional hydrogen atoms were added per aromatic group. When this number was compared to the amount of hydrogen contained in each grafted strand of GC (5), a reasonable correlation with 2 grafted glycerol chains per aromatic unit was made. This result supports the findings by other groups that the reaction of lignin with organic carbonates is controlled to the extent that extended polyglycerol chains are not formed under normal reaction conditions. In this analysis, 13C NMR did not provide high enough resolution to make a more quantitative study of the amount of alkyl chains added to the lignin structure.

The FTIR spectra of OKL (FIG. 4) shows the successful grafting of oxyalkylated strands with an increase in signals in the 1100-1200 $cm^{-1}$ region associated with C—O stretching, as well as in increase in the overall O—H signal at 3500 $cm^{-1}$, as a result of the O—H terminated groups. The carbonyl region of the oxyalkylated precursor shows an interesting result. The side peak at ~1725 $cm^{-1}$ shows the formation of carbonyl groups witnessing to the formation of linear carbonate linkages between lignin hydroxyl groups and GC. Cyclocarbonate groups (CC) can also be found after the reaction with GC as witnessed by the peak at 1795 $cm^{-1}$. Overall, the FTIR spectrum confirmed the presence of both etherified and carboxylated groups in the oxyalkylated strands successfully functionalizing lignin with extended hydroxyl groups utilized in a second step for cyclocarbonation.

Figure 6:
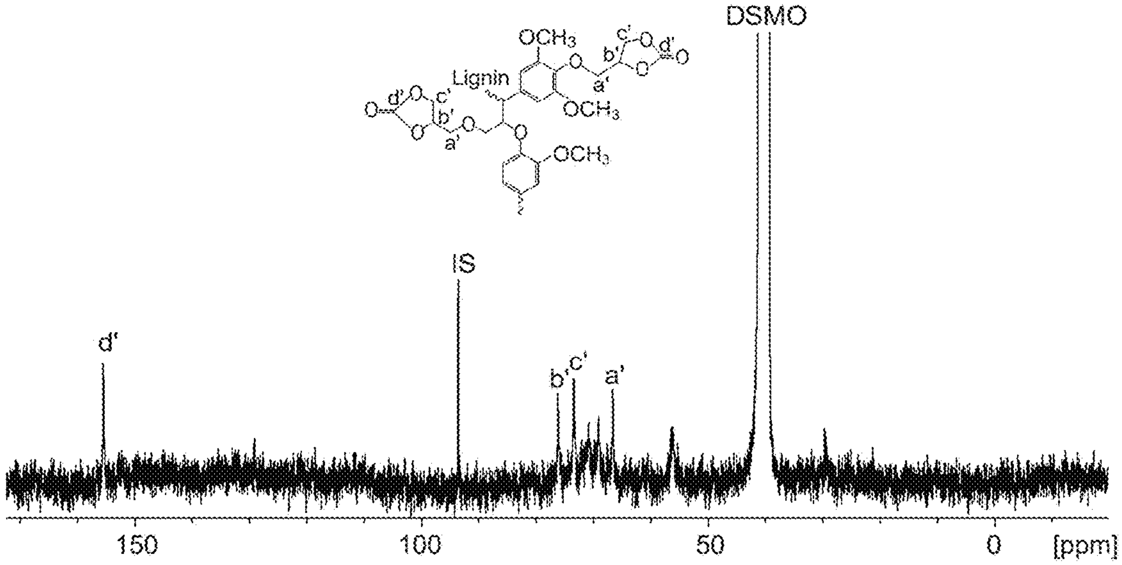
FIG. 6 presents $^{13}C$ NMR of cyclocarbonated lignin-based precursor formed according to disclosed methods.

The diols present on the lignin structure were converted to cyclocarbonate groups by a subsequent reaction with dimethyl carbonate (FIG. 2). The successful reaction was confirmed by the increase in the CC peak at 1795 $cm^{-1}$ in FTIR (FIG. 4), as well as the increase in prominence of the hydrogens associated with the carbonate ring at 4.5-5.5 ppm in the $^{1}H$ NMR (FIG. 3). Quantification of the CC groups was made through the application of $^{13}C$ NMR by comparing the characteristic peak of the cyclocarbonate at 155 ppm to that of an internal standard (trioxane) at 90 ppm (FIG. 6). Quantification showed a lignin derivative containing a concentration of CC groups of 2.05±0.05 mmol/g lignin.

Example 2

The precursor formed as described above was utilized in formation of NIPU. The formation reaction involved the addition of a diamine as curing including one sample utilizing a fatty acid-based dimer agent containing 100% renewable carbon. Diamines examined included hexamethylene diamine (HMD), decamethylene diamine (DMD), and Priamine® 1074. The proprietary Priamine® diamine was not given a molar mass by the supplier but contains a reported amine value of 209 mg KOH/g. Using equation 1 and the amine value, it was possible to calculate the molecular weight of the Priamine® diamine as 537 g/mol.

$$MW=56{,}100\times(\#\text{of amine H})+(\text{amine value}\times\#\text{of H per N}) \quad (1)$$

NIPU materials were formed by mixing CCL with different stoichiometric ratios of the diamine (CC:amine—1:1, 1:1.5, 1:2) to study to difference in crosslinking density and mechanical properties afforded by the different reaction mixtures. A small amount of DMSO was used to aid in dissolution and compatibilization of the two constituents and the organocatalyst TBD was used at 0.1 equivalents to ensure a full reaction between CC groups and amines.

Figure 8:
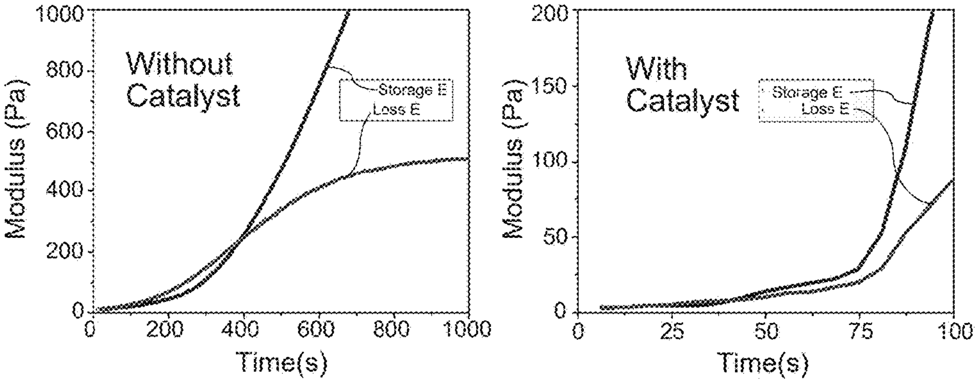
FIG. 8 presents the curing rheology of NIPU reaction mixtures.

The kinetics of the curing reaction was studied by monitoring the gel time of the reaction mixture at 80° C. using a parallel plate rheometry (FIG. 8). As shown, there was a sharp increase in elastic modulus for the Priamine® uncatalyzed sample at around 6.5 minutes and for the catalyzed Priamine® system around 1.5 minutes. Given that a time of 1.5 minutes was needed to lower the geometry of the rheology instrument and start the program, the gel time of the uncatalyzed system stands at 8 minutes and that of the catalyzed system at 3 minutes. The fast kinetics observed demonstrated the creation of a highly reactive lignin precursor using a non-toxic protocol.

Reaction conditions and results for the different diamines are summarized in Table 2, below. Solubility was tested with DMSO, $CDCl_3$, DMF, THF, m-cresol, and TFAc Anhydride.

TABLE 2

| Diamine:CC ratio | Reaction conditions | Product Solubility | Physical Characteristics |
|---|---|---|---|
| HMD/1:1 | 150° C., 16 hr | Insoluble | Brittle solid |
| DMD/2:1 | 150° C., 16 hr | Insoluble | Glassy solid |
| Priamine/1:1 | 80° C. 6 hr, 150° C. 4 hr. | Insoluble | Hard Solid |
| Priamine/1.5:1 | 80° C. 6 hr, 150° C. 4 hr. | Insoluble | Hard Solid |
| Priamine/2:1 | 80° C. 6 hr, 150° C. 4 hr. | Insoluble | Elastic Solid |

Figure 9A:
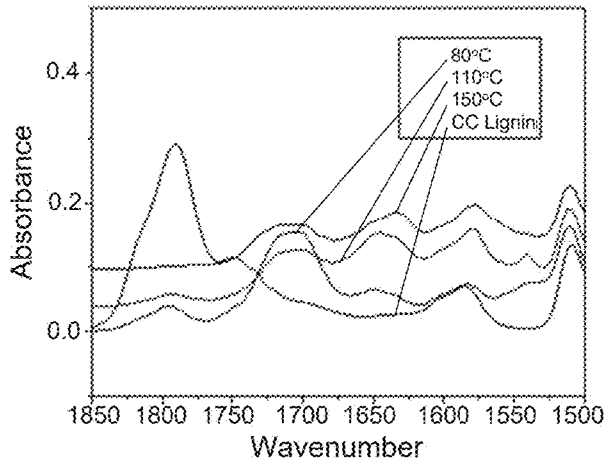
FIG. 9A presents an expanded view of the carbonyl region of FTIR of cured NIPU materials cured at different temperatures.

Due to the heavily crosslinked nature of the NIPUs and the increase in hydrogen bonding created from the extra hydroxyl group formed during the ring opening reaction during curing, the synthesized materials mostly showed complete insolubility in common organic solvents, as well as treatment with hexafluorisopropanol and trifluoracetic anhydride. For this reason, the extent of the polymerization reaction was monitored by FTIR watching the conversion of the CC peak at 1795 $cm^{-1}$ to the C—N—O stretch of the urethane carbonyl at 1700 $cm^{-1}$. FIG. 9A shows an expanded view of the carbonyl region of the FTIR of NIPU samples formed with the Priamine® product cured with increasing temperature. The sample cured at 80° C. showed unreacted cyclocarbonate groups present in the structure whereas increasing the curing temperature to 110° C. shows a smaller proportion of unreacted groups. When the curing temperature was increased to 150° C., the complete conversion of cyclocarbonate groups to urethane groups was observed. Therefore, the maximum curing temperature of 150° C. was chosen for subsequent synthetic efforts.

A series of samples varying the stoichiometry of the curing agent were made. Samples were synthesized using a ratio of CC lignin:amine of 1:1, 1:1.5, and 1:2. CC lignin (2.0 mmol/g cyclocarbonate) was dissolved in DMSO in a 20 ml scintillation vial. The dimer diamine (MW=537 g/mol, functionality=2) was added according to different stoichiometric ratios of the CC groups to amine functionality (CC:amine 1:1, 1:1.5, 1:2). DMSO was added according to the following ratio: 1.3 mL DMSO: 1 g CC lignin. The reaction mixture was heated gently to allow the dissolution and mixture of both components and then poured in preheated molds at and subjected to curing at 80° C. for 4 hours, 150° C. for 4 hours, and 80° C. for 2 hours.

Figure 9B:
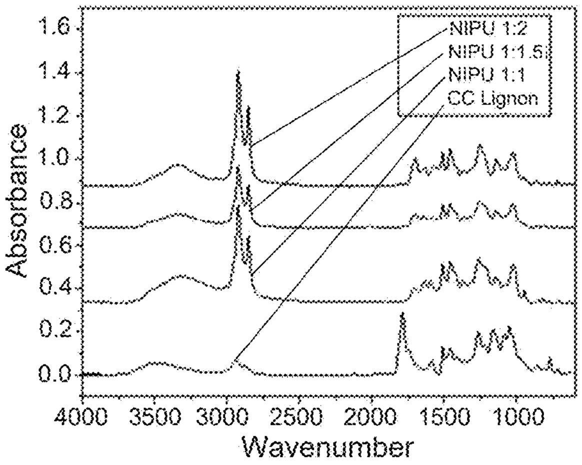
FIG. 9B presents FTIR of NIPU materials formed with varying reaction stoichiometries and compared to cyclocarbonated (CC) lignin precursor.
Figure 9C:
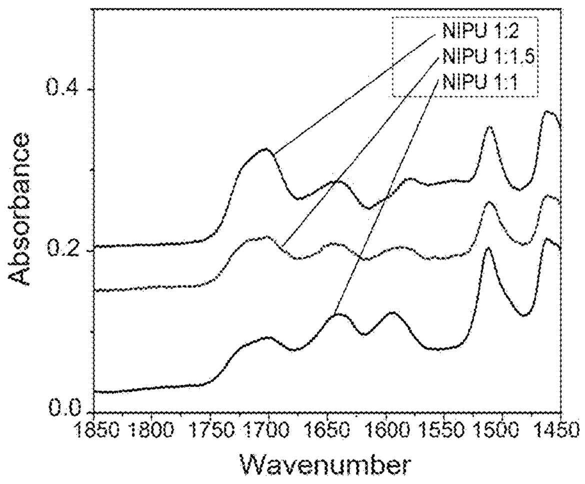
FIG. 9C presents an expanded view of the carbonyl and aromatic region of FTIR of cured NIPU samples formed with varying reaction stoichiometry.

FTIR (FIG. 9B; FIG. 9C) shows that all NIPU samples observe a complete conversion of the cyclocarbonate peak at 1795 $cm^{-1}$ to urethane carbonyls at 1700 $cm^{-1}$ as well as a side peak at 1640 $cm^{-1}$ showing the existence of urea groups within the structure. The presence of urea groups is not surprising at a cure temperature of 150° C. and is also common in conventional polyurethanes formed through the reaction of diisocyanates. The large peaks at 1600 $cm^{-1}$ and 1500 $cm^{-1}$ are caused by the aromatic skeletal bands of lignin and hide the N—H deformation normally found around 1500. The incorporation of the aliphatic diamine is witnessed by the replacement of the OH stretch at 3500 $cm^{-1}$ in the cyclocarbonated lignin precursor to the N—H stretch at 3300 $cm^{-1}$, as well as the large increase in the methylene signal present as two peaks centered near 2900 $cm^{-1}$.

The bio-based content of the samples was calculated based on the procedure of Pan et al. (Biomacromolecules 12, 2416-2428 (2011)) by relating the total amount of biorenewable carbon to the total amount carbon present in each NIPU formulation. The lignin carbon content (65%) was estimated using published data for the elemental analysis of Kraft lignin (Forests 10, (2019)). The carbon content of the dimer diamine (80%) was estimated based on the molecular weight and estimated molecular structure since an exact structure was not provided by the manufacturer. The only non-renewable carbon content present in the polymeric structure was based on the incorporation of cyclocarbonate structures from the reaction with organic carbonates. Although there are bio-based routes to their synthesis, glycerol carbonate and dimethyl carbonate are still currently synthesized from petroleum feedstocks. Table 3 below shows the high bio-content achieved for the lignin-derived NIPUs formed with Priamine®. As the ratio of CC lignin to curing agent becomes more stoichiometric, the bio-content decreases as the weight percent of the cyclocarbonate component increases. The cyclocarbonate component was calculated based on $^{13}C$ NMR as reported above based on the assumption that an average of 1 grafted glycerol chain was present per cyclocarbonate group.

TABLE 3

| Sample | Lignin and diamine carbon (renewable) | CC carbon (non-renewable) | Bio-renewable carbon content |
|---|---|---|---|
| 1:1 NIPU | 1.15 g | .096 g | 92.3% |
| 1:1.5 NIPU | 1.41 g | .096 g | 93.6% |
| 1:2 NIPU | 1.66 g | .096 g | 94.5% |

Beneficially, when using bio-based sources for the cyclocarbonate reagent, it is possible to achieve materials with 100% renewable bio-based carbon content. For example, testing of a NIPU foam formed with a 1:1 CC to lignin ratio for bio-based carbon according to ASTM D6866-20 using radiocarbon analysis revealed a 100 pMC (percent Modern Carbon) content.

Figure 10:
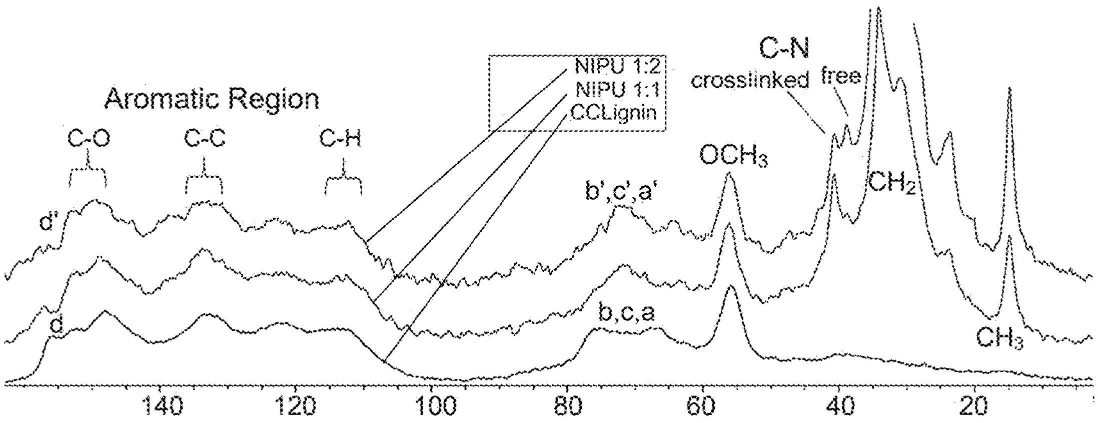
FIG. 10 presents solid state NMR of NIPU samples formed with different reaction stoichiometry compared to CC lignin precursor.

To further probe the chemical structure of the synthesized NIPUs, solid state (ss) NMR was utilized given the insolubility of the materials in common solvents used to prepare conventional NMR. SS NMR provided excellent structural characterization of NIPU 1:1 and NIPU 1:2 compared to the CC lignin precursor (FIG. 10). Structural assignment was made based on literature reports. The reaction of CC lignin with the aliphatic dimer diamine showed a shift in the cyclocarbonate carbonyl present at 155 ppm (d) to a urethane bonded carbonyl slightly downfield (d'). In the alpha position of the urethane bond is an aliphatic C—N bond which appears at 40 ppm when the diamine is crosslinked and 39 ppm when the diamine is a chain terminating species ("free"). NIPU 1:2 shows a higher signal for "free" C—N bonds than NIPU 1:1 as the excess curing agent limits the amount of crosslinking available during the reaction by creating amine terminated lignin species. The signals for the cyclocarbonate carbons a-c in CC lignin become condensed after the curing reaction showing the more similar chemical environment for C—O and C—O—H (a'-c') carbons after the curing reaction. Farther upfield, the methylene signal appears at 30 ppm reflecting the incorporation of the long-chained dimer diamine. The signal in this region for NIPU 1:2 is larger than NIPU 1:1 reflecting the larger amount of the curing agent added in the reaction mixture. Overall, ss NMR confirms the successful reaction of CC lignin and the curing agent, as well as pointing out the relevant structural features that accompany different reaction mixture stoichiometries.

Figure 11:
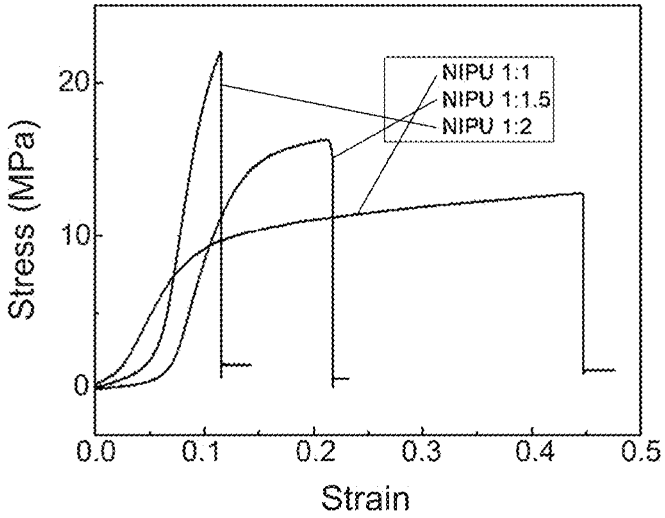
FIG. 11 presents results of uniaxial tensile testing of NIPU materials formed with varying reaction stoichiometries.

Tensile tests were completed on dog bone shaped samples using a 1 kN load cell and 5 mm/min crosshead speed. Samples using a curing agent ratio of 1:1, 1:1.5 and 1:2 (CC lignin:amine) were tested to explore the change in mechanical properties as the crosslinking density was changed. The results reported in Table 4, below, show that the highest ultimate strength values of 20.9 MPa were obtained when a stoichiometric ratio was used (1:1) between CC lignin and diamine. The stoichiometric samples did demonstrate some difficulty when clamping during tensile testing. However, adding a slight excess (no more than .25 mol fraction) of the diamine before curing allowed for less cracking during analysis with no observable difference in tensile strengths. Higher ratios of diamine (NIPU 1:1.5 and 1:2) incorporate larger proportions of fatty acid-based soft segments in the polymeric structure leading to an increase in ultimate strain and a corresponding decrease in modulus. When the ratio of amine groups to CC groups is increased to 2 (NIPU 1:2), a dramatic increase in the ultimate strain and decrease in modulus is observed pointing to more elastic samples. The NIPU 1:2 sample represents the highest theoretical amount of soft segment incorporation in the polymeric structure by inserting a long-chained diamine molecule at each CC group (FIG. 7, FIG. 10). The decrease in ultimate tensile strength and modulus was complimented by the results of DMA analysis showing a decrease in crosslinking density of NIPU 1:2 in DMA. Overall, the tensile test results confirmed the molecular structure determination of ss NMR that revealed a higher incorporation of soft segments (aliphatic diamine) in the NIPU 1:2 sample leading to a dramatic increase in the elasticity of these materials. Representative stress-strain curves for each sample is presented in FIG. 11.

TABLE 4

| NIPU | Ultimate Tensile Strength (MPa) | Ultimate Strain (%) | Tensile Modulus (MPa) |
|---|---|---|---|
| 1:1 | 20.9 ± 3.6 | 10.7 ± 2.8 | 400.6 ± 86.0 |
| 1:1.5 | 15.8 ± 2.2 | 13.0 ± 4.0 | 307.7 ± 45.3 |
| 1:2 | 12.2 ± 0.54 | 38.9 ± 7.5 | 137.3 ± 23.8 |

Figure 12:
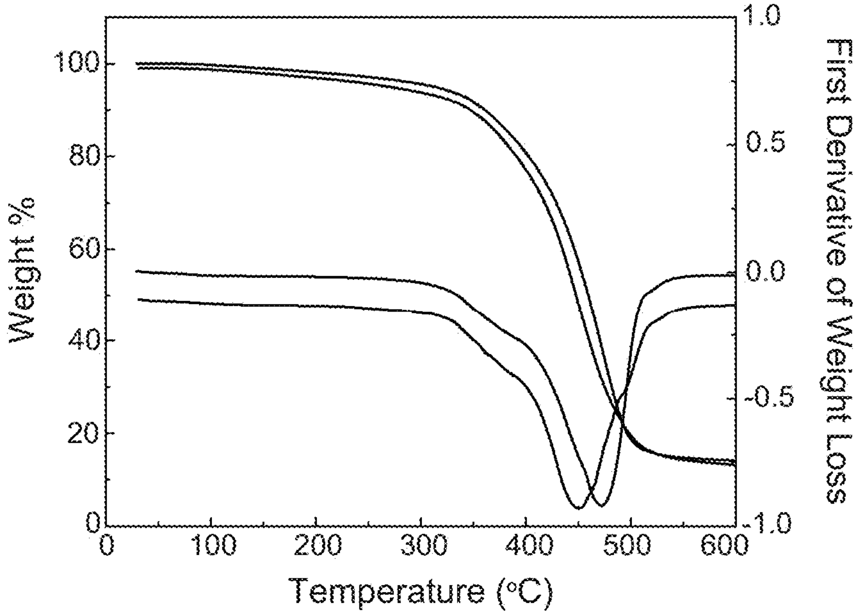
FIG. 12 presents thermogravimetric analysis of NIPU materials formed with varying reaction stoichiometries.
Figure 13:
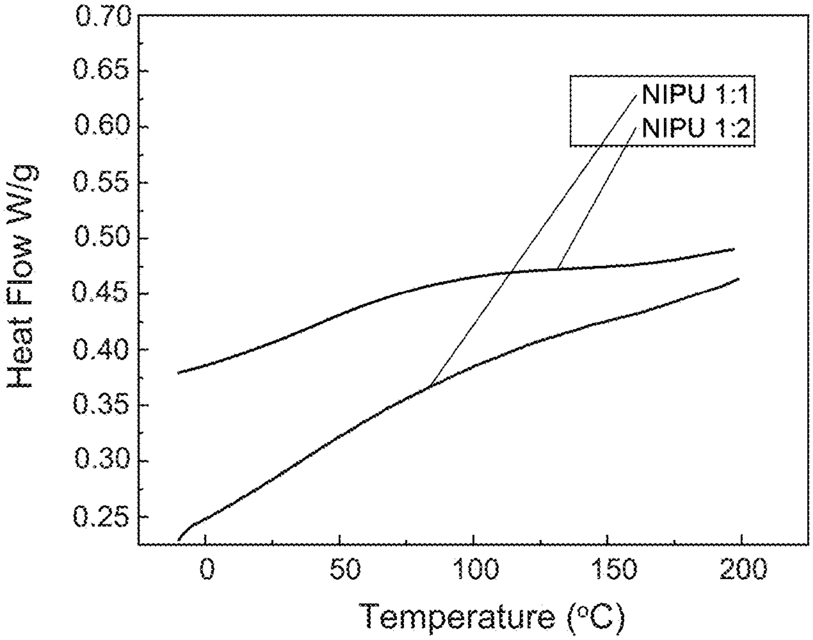
FIG. 13 present DSC thermograms of the second heating cycle of NIPU materials formed with varying reaction stoichiometries.

Thermal analysis of the NIPUs showed a material with similar thermal stability to commercial polyurethanes. TGA analysis (FIG. 12) revealed 5% weight loss temperatures ($T_{5\%}$) above 300° C. Thermal breakdown followed a typical two-step mechanism as revealed by the curve for the first derivative of weight loss (FIG. 13). The first derivative shows the dissociation of the urethane bond around 350° C. followed by rapid breakdown of the lignin and diamine constituents.

Figure 14:
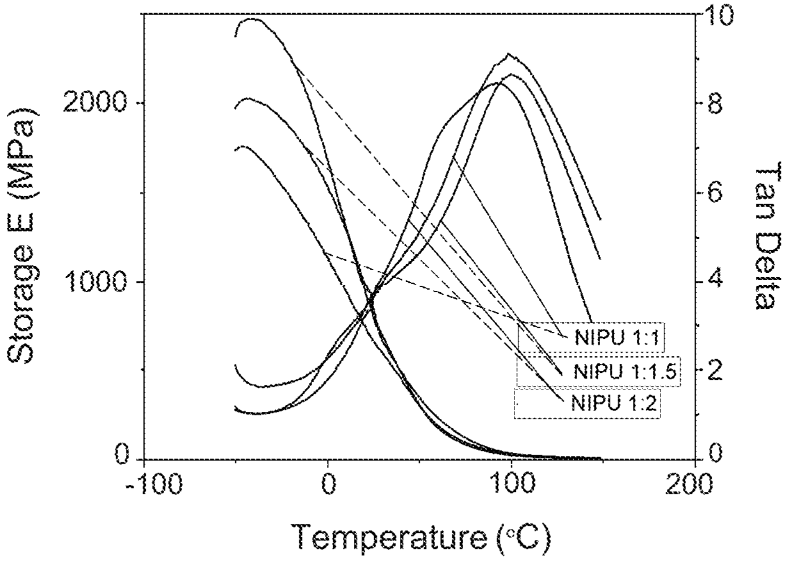
FIG. 14 presents dynamic mechanical analysis of NIPU samples showing Storage Modulus and Tan Delta curves.

DSC results showed no peaks for melting or crystalizing events in the temperature range from −20° C. to 200° C. typical of thermosetting crosslinked materials (FIG. 13). Glass transition temperatures were measured from the change in slope present in the second heating curve of DSC thermograms. As expected, higher loadings of the aliphatic curing agent created a more dramatic transition from the glassy state while $T_g$ decreased from 94° C. in NIPU 1:1 to 84° C. in NIPU 1:2. These results aligned well with the glass transition temperature found from DMA analysis. DMA was completed at a fixed frequency (1 Hz) from −50° C. to 150° C. showing properties of a crosslinked material. The peak in the Tan Delta plot is associated with the $T_g$ of the polymer network (alpha relaxation) and is observed to decrease from 99° C. with NIPU 1:1 to 91° C. for the 1:2 NIPU sample (FIG. 14). An additional maxima is found in NIPU 1:2 around 75° C. from relaxation associated with the dimer diamine, while at higher temperature is associated with the lignin macromolecular structure. The plots for DMA thus reflect a dual-phase material with a broad transition region between 0° C. and 100° C.

Using viscoelastic polymer theory, it is possible to measure the crosslinking density and molecular weight between crosslinks using the rubbery plateau found in the storage modulus after the alpha relaxation temperature in DMA. The rubbery plateau can be found at Ta+20 located after the broad transition from the glassy region. (FIG. 14). The crosslinking density (Ve') can be found through equation 2:

$$V_e' = \frac{E'}{3RT} \tag{2}$$

in which

E' is the elastic modulus at $T_{\alpha+}20$,

R is the gas law constant and

T is $T_{\alpha+}20$

The crosslinking density for each sample is displayed in Table 5 below and is seen to decrease with increasing soft segment incorporation from NIPU 1:1 to NIPU 1:2. A high degree of crosslinking is observed creating exceptionally high storage modulus (~14-20 MPa) in the area of the rubbery plateau.

The average molecular weight of crosslinks (Mc) can be found by using the data from the rubbery plateau and equation 3:

$$M_c = \frac{3\rho RT}{E'} \tag{3}$$

in which

ρ is the density of the polymer,

T is $T_{\alpha+20}$ and

E' is the elastic modulus at Tα+20

Using this relationship, the average molecular weight between crosslinks in the NIPU 1:1 sample was calculated to be 536.9 g/mol corresponding precisely to the molecular weight of the dimer diamine used in the curing reaction (537 g/mol). When an excess of diamine is used in NIPU 1:1.5 and NIPU 1:2, the average crosslinking molecular weight increases as a consequence of the incorporation of a larger amount of amine terminated lignin species interacting through hydrogen bonding.

TABLE 5

| Sample | $T_{5\%}$ | $T_g$ (DSC) | $T_\alpha$ (DMA) | Crosslinking Density (mol/m$^3$) | Average MW of Crosslinks (g/mol) |
|---|---|---|---|---|---|
| 1:1 | 301° C. | 94° C. | 99.0 | 1863 | 536.9 |
| 1:1.5 | — | — | 98.2 | 1619 | 617.6 |
| 1:2 | 316° C. | 84.0° C. | 91.9° C. | 1538 | 650.2 |

Figure 15:
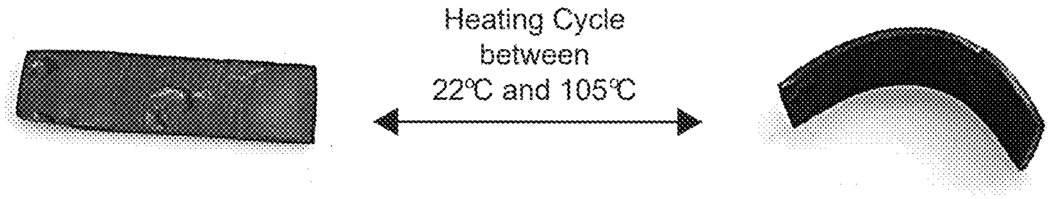
FIG. 15 illustrates shape memory characteristics of NIPU materials.

Given the $T_g$ of the NIPU samples located around 100° C., the shape memory effect of the samples was tested by heating the cured NIPUs in an oven set a 105° C. for 10 minutes, then inducing a semicircular deformation upon cooling at room temperature. Shown in FIG. 15, the NIPU material was able to maintain the deformation after cooling to room temperature and to demonstrate reversibility back to the pre-deformed shape upon re-heating. This effect was observed for all NIPU samples regardless of the curing agent stoichiometry confirming the dual phase character of these samples and their ability to act as shape memory materials.

Example 3

A chemical foaming agent was added to a reaction mixture as described above to study the ability to process NIPU foams. 1 gram of CC lignin was dissolved in 1.3 mL DMSO in a 20 mL scintillation vial. The dimer diamine was added according to a 1:1 and 1:2 ratio of CC:amine groups based on the molar mass of the diamine and its density (0.9 g/mL). PMHS was added based on a 1.5 and 3.0% volume fraction of the total reaction mixture. A corresponding amount of diamine was added based on a 90% mass content of the hydrosiloxane unit in PMHS. The mixture was stirred for 1 minute and added to conical aluminum molds with a base diameter of 30 mm. Foams were subjected to curing at 150° C. for 12 hours. When finished, the product was cut to 25×25 mm square sections and subjected to compression testing. Poly(methylhydrosiloxane) was added to react with the diamine curing agent to release hydrogen gas and induce foaming. It was found through an iterative process that a ratio of 1.3 ml DMSO:1 g CC lignin was the optimal conditions to support foam rise during the curing process. PMHS was initially added in various volume percentages relative to the reaction mixture to form the lowest density foam. It was found that at 3% PMHS volume compared to reaction mixture volume produced consistent samples with the highest rise height and the lowest density. Additional diamine was added in stoichiometric proportions to react with PHMS to allow the reaction stoichiometry to remain consistent. Both the reaction mixture corresponding to the NIPU 1:1 and the NIPU 1:2 was utilized for the foaming reaction at 3% volume PMHS. Additional materials were made at 1.5% PMHS for comparison.

Table 6 shows the results for physical and mechanical testing of the NIPU foams. Densities for all formulations placed these materials in the region of high-density foams between 241-337 kg/$m^3$. A negligible difference in density is made by changing the ratio of curing agent between NIPU 1:1 and 1:2; however, a noticeable difference in the properties can be seen according to the amount of foaming agent added during processing. Using a 3% amount of PMHS clearly results in lower density foams with a corresponding decrease in compressive modulus.

The results for compression testing in Table 6 show a compressive strength of greater than 100 kPa at 10% strain by the foams made from a stoichiometric amount of diamine (NIPU 1:1). Mechanical testing clearly shows using a stoichiometric amount of curing agent results in greater compressive strengths and comparable modulus to the NIPU 1:2 samples, revealing no net gains in properties using excess diamine in the 1:2 samples. The compressive testing of these foams aligns with the general principle that an increase in compressive strength is observed for materials with higher crosslinking density (NIPU 1:1 vs. NIPU 1:2) and apparent density (1.5% PMHS vs. 3.0% PMHS).

TABLE 6

| NIPU/ Foam % | Density (kg/$m^3$) | Porosity φ | Volume Expansion ϕ | Compressive Strength (10%, kPa) | Compressive Modulus (MPa) |
|---|---|---|---|---|---|
| 1:1/3% | 241 ± 34 | 0.76 ± 0.03 | 4.32 ± 0.60 | 131.8 ± 37.9 | 1.42 ± 0.22 |
| 1:1/1.5% | 337 ± 57 | 0.67 ± 0.06 | 3.11 ± 0.48 | 170.0 ± 18.6 | 1.64 ± 0.32 |
| 1:2/3% | 241 ± 45 | 0.76 ± 0.04 | 4.40 ± 0.96 | 79.2 ± 18.5 | 1.34 ± 0.25 |
| 1:2/1.5% | 331 ± 39 | 0.68 ± 0.04 | 3.12 ± 0.37 | 111.9 ± 28 | 1.19 ± 0.30 |

Figure 16:
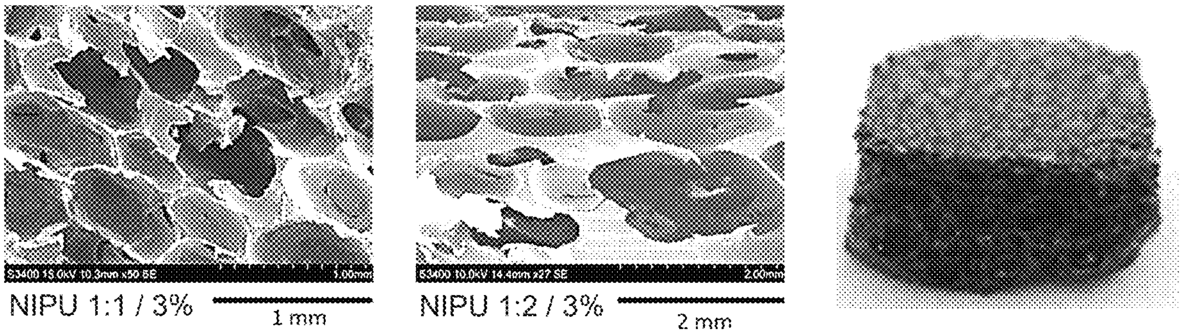
FIG. 16 provides SEM images of NIPU foams as described herein including a foam formed by reaction with a stoichiometric amount of diamine that has a mostly closed cell content (left) a foam formed by reaction with excess diamine (center) having an open cell morphology and a photograph (right) of a foam as described of density ~300 $kg/m^3$.

Structural morphology of the NIPU foams was examined using SEM analysis. FIG. 16 shows images of the lowest density foams at 3% PMHS. The NIPU 1:1 foam contains mainly closed cell content of 1 mm length or less (left), while the 1:2 NIPU sample contains more open cell content of larger 2 mm length cells (center). Given that the nonporous NIPU material has a density of approximately 1000 kg/$m^3$ for both NIPU 1:1 and 1:2, the porosity (φ) and volume expansion (ϕ) of the foamed materials can be calculated according to equations 4 and 5, respectively:

$$\varphi=1-(\rho_f/\mu_m) \quad (4)$$

$$\varphi=(\rho_f/\rho_m) \quad (5)$$

in which $\rho_m$ is the density of the original material and $\rho_f$ is the density of the foamed material Results shown in Table 6 reflect an over four-fold increase in volume during the foaming reaction corresponding to porosity values of around 0.75.

Example 4

A lignin-based precursor as described above was utilized in conjunction with a linear bio-based cyclocarbonate (sebacic bis-cyclocarbonate) in an NIPU formulation.

Sebacic bis-cyclocarbonate can be synthesized from sebacic acid (a derivative of castor oil) or sebacoyl chloride and a bio-based glycerol carbonate according to known processes. This linear cyclocarbonate was added in different feed ratios with a lignin-derived cyclocarbonate and reacted with a diamine and a foaming agent as described previously to form a series of NIPU foams with varying characteristics. Overall, it was found that the addition of the sebacic bis-cyclocarbonate imparted a softer character to the foams, believed to be through the incorporation of linear strands between the rigid lignin backbone.

Figure 17:
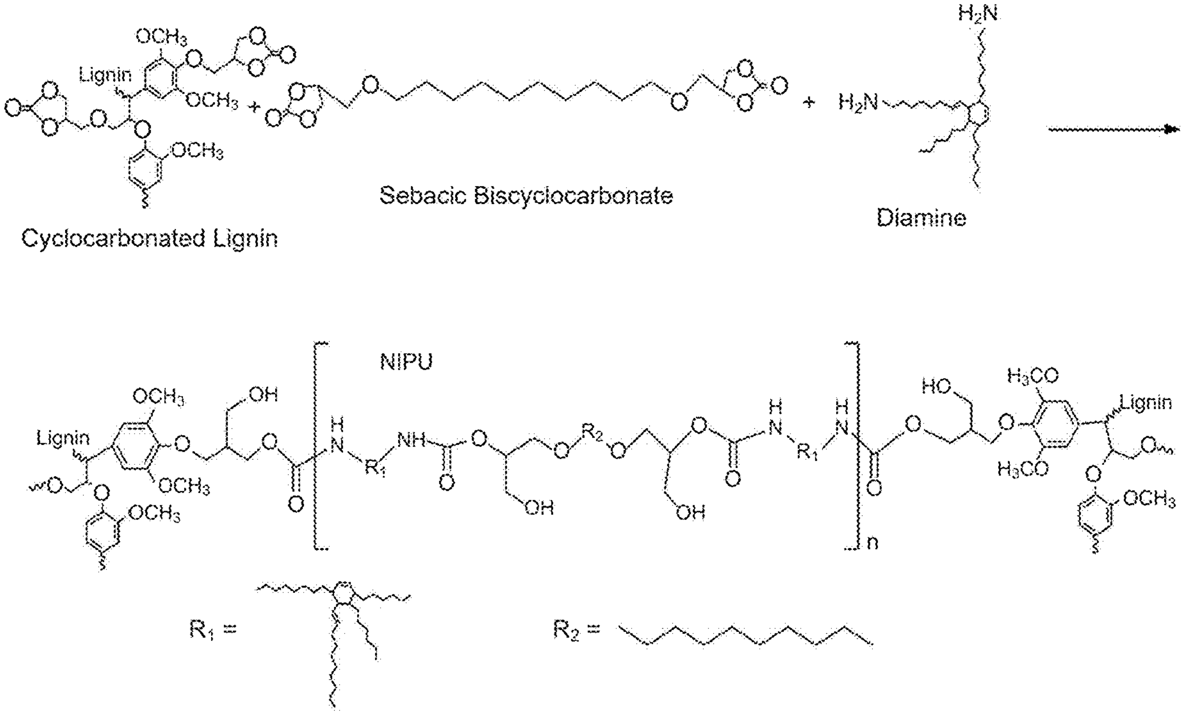
FIG. 17 provides a reaction mechanism for formation of a bio-based NIPUF as described herein.
Figure 18:
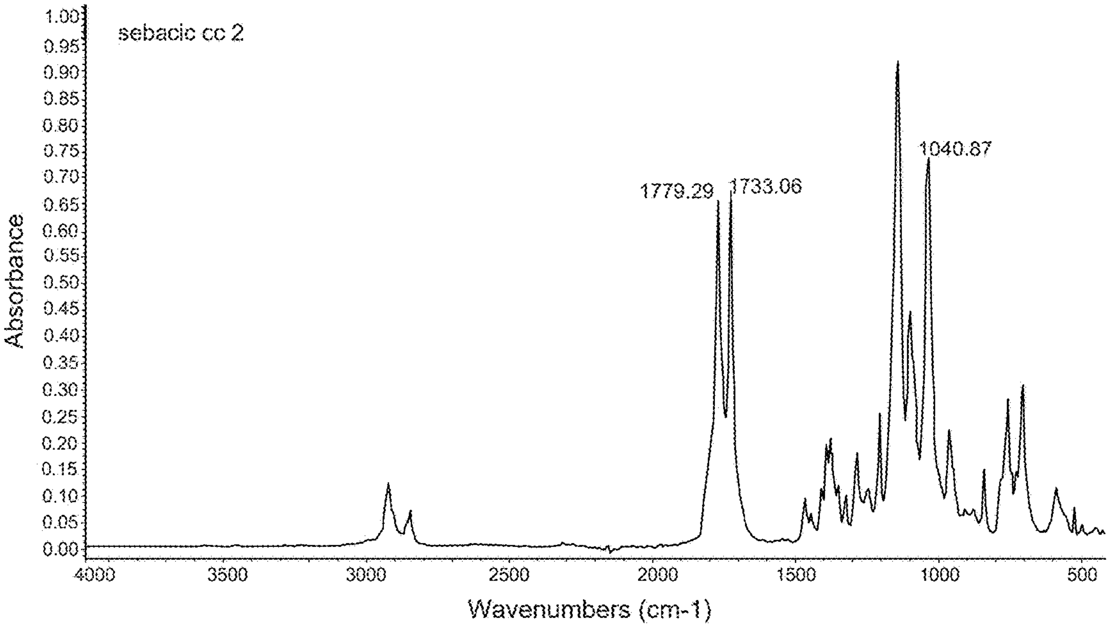
FIG. 18 provides FTIR analysis of sebacic bis-cyclocarbonate utilized in forming NIPUF as described herein.
Figure 19:
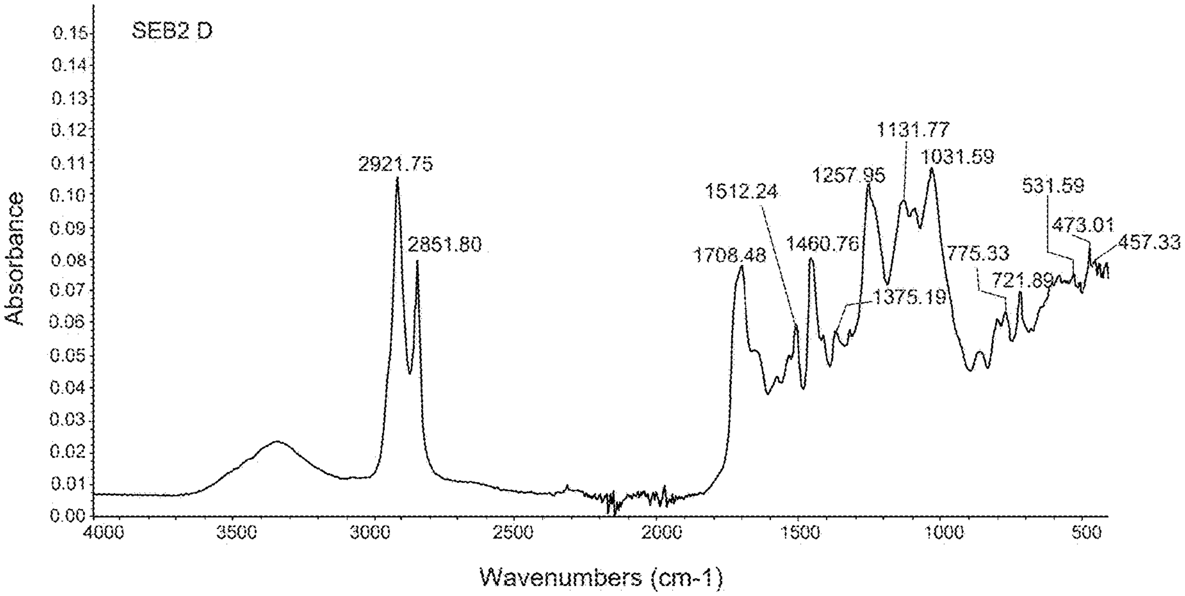
FIG. 19 provides FTIR analysis of NIPUF formed from a mixture of two different bio-based precursors as described herein.

The overall formation reaction is illustrated in FIG. 17. FIG. 18 presents the FTIR of sebacic bis-cyclocarbonate used in forming the NIPUF. The characteristic cyclocarbonate peak can clearly be seen. FIG. 19 presents the FTIR of NIPUF formed with a 50/50 sebacic bis-cyclocarbonate/lignin-based cyclocarbonate mixture cured with a bio-based diamine. As can be seen, there is no residual cyclocarbonate peak, providing evidence of full conversion to urethane groups at 1708 $cm^{-1}$.

While certain embodiments of the disclosed subject matter have been described using specific terms, such description is for illustrative purposes only, and it is to be understood that changes and variations may be made without departing from the spirit or scope of the subject matter.

What is claimed is:

1. A non-isocyanate polyurethane comprising the reaction product of a bio-based precursor and a diamine, the bio-based precursor comprising a functionalized polyol, the polyol comprising a bio-based polyol, the functionalization comprising cyclic carbonate functionality in a concentration of about 1.8 mmol cyclic carbonate per gram polyol or greater, the non-isocyanate polyurethane a bio-based carbon content of about 90% or greater as determined by radiocarbon dating according to ASTM D6866-20.

2. The non-isocyanate polyurethane of claim 1, wherein the diamine comprises a fatty acid diamine such as a polyvalent fatty acid diamine.

3. The non-isocyanate polyurethane of claim 1, wherein the non-isocyanate polyurethane has one or more of the following characteristics:

an ultimate strain of about 10 MPa or greater;

a tensile modulus of about 135 MPa or greater;

a density of about 100 $kg/m^3$ or greater;

a density of about 150 $kg/m^3$ or less;

a compressive strength at 10% strain of about 80 kPa or greater.

4. The non-isocyanate polyurethane of claim 1, wherein the non-isocyanate polyurethane is a non-isocyanate polyurethane foam.

* * * * *